United States Patent
Anderson et al.

(10) Patent No.: US 11,468,508 B2
(45) Date of Patent: Oct. 11, 2022

(54) CAPTURABLE CODE FOR AUTOMATICALLY FORMATTING AND ADDRESSING A TEXT MESSAGE TO APPLY FOR AN OFFER

(71) Applicant: Comenity LLC, Columbus, OH (US)

(72) Inventors: Chris Anderson, Columbus, OH (US); Manoj Ram Tammina, Columbus, OH (US); Jess Lawrence, Lewis Center, OH (US)

(73) Assignee: InvenSense, Inc., San Jose, CA (US)

( * ) Notice: Subject to any disclaimer, the term of this patent is extended or adjusted under 35 U.S.C. 154(b) by 0 days.

(21) Appl. No.: 16/684,461

(22) Filed: Nov. 14, 2019

(65) Prior Publication Data
US 2020/0294127 A1    Sep. 17, 2020

Related U.S. Application Data

(60) Provisional application No. 62/818,038, filed on Mar. 13, 2019.

(51) Int. Cl.
*G06Q 40/02* (2012.01)
*G06Q 30/02* (2012.01)
(Continued)

(52) U.S. Cl.
CPC ....... *G06Q 40/025* (2013.01); *G06Q 30/0236* (2013.01); *H04W 12/06* (2013.01); *H04W 12/63* (2021.01); *H04W 12/64* (2021.01)

(58) Field of Classification Search
None
See application file for complete search history.

(56) References Cited

U.S. PATENT DOCUMENTS

| 8,494,488 B1 * | 7/2013 | Tyler | H04W 4/50 |
| | | | 725/31 |
| 8,949,706 B2 * | 2/2015 | McCabe | G06Q 10/10 |
| | | | 713/180 |

(Continued)

OTHER PUBLICATIONS

R. K. Wong, "mContext: A Mobile Context-Aware Search System for Enterprise," 2007 4th IEEE Consumer Communications and Networking Conference, Las Vegas, NV, USA, 2007, pp. 1194-1195 (m-Context) (Year: 2007).*

(Continued)

*Primary Examiner* — Chikaodinaka Ojiaku

(57) ABSTRACT

A capturable code for automatically formatting and addressing a text message to apply for an offer is disclosed. The method interacting with, via a mobile device of a user, a capturable code and automatically generating a text message on the mobile device in response to the interaction. The automatic generation automatically provides an address for the text message, and automatically formats the text message. Providing, at the mobile device and into the text message, at least one device identifier (ID) for the mobile device and a user identifier (ID). Sending, via the mobile device, the text message to the address. Receiving, at the mobile device, a prepopulated form, which is prefilled with user specific information. Verifying, at the mobile device, the user specific information. Receiving, at the mobile device and upon a credit approval, a new credit account in a ready-to-use format.

20 Claims, 14 Drawing Sheets

(51) Int. Cl.
*H04W 12/06* (2021.01)
*H04W 12/63* (2021.01)
*H04W 12/64* (2021.01)

(56) References Cited

U.S. PATENT DOCUMENTS

| | | | | |
|---|---|---|---|---|
| 8,949,708 | B2* | 2/2015 | Peterson | G06F 21/645 |
| | | | | 715/234 |
| 9,230,130 | B2* | 1/2016 | Peterson | H04L 63/0853 |
| 9,251,131 | B2* | 2/2016 | McCabe | G06F 40/174 |
| 9,268,758 | B2* | 2/2016 | Gonser | G06F 40/174 |
| 9,501,769 | B2* | 11/2016 | Guerin | G07F 7/025 |
| 9,628,462 | B2* | 4/2017 | Gonser | G06F 21/316 |
| 9,639,597 | B2* | 5/2017 | Eigner | G06F 16/285 |
| 9,741,045 | B1* | 8/2017 | Henderson | G06Q 20/401 |
| 9,824,198 | B2* | 11/2017 | Carroll | G06F 21/64 |
| 10,198,515 | B1* | 2/2019 | White | G06F 16/215 |
| 10,511,732 | B2* | 12/2019 | Gonser | H04N 1/00474 |
| 2010/0042520 | A1* | 2/2010 | Rose | G06Q 20/26 |
| | | | | 705/30 |
| 2012/0209735 | A1* | 8/2012 | Subramanian | H04L 9/321 |
| | | | | 705/26.1 |
| 2014/0032723 | A1* | 1/2014 | Nema | G06F 21/32 |
| | | | | 709/220 |
| 2014/0173695 | A1* | 6/2014 | Valdivia | H04W 12/06 |
| | | | | 726/4 |
| 2014/0247278 | A1* | 9/2014 | Samara | G06K 17/0016 |
| | | | | 345/633 |
| 2016/0110694 | A1* | 4/2016 | Walz | G06Q 20/3224 |
| | | | | 705/14.27 |
| 2016/0110707 | A1* | 4/2016 | Nack | G06Q 20/3224 |
| | | | | 705/38 |
| 2016/0189152 | A1* | 6/2016 | Walz | G06Q 20/3274 |
| | | | | 705/14.27 |
| 2016/0189192 | A1* | 6/2016 | Walz | G06Q 30/0233 |
| | | | | 705/14.25 |
| 2017/0039588 | A1* | 2/2017 | Koltnow | G06Q 30/0236 |
| 2017/0039616 | A1* | 2/2017 | Korra | G06Q 30/0613 |
| 2017/0302641 | A1* | 10/2017 | Ramatchandirane | |
| | | | | H04L 63/0492 |
| 2017/0346851 | A1* | 11/2017 | Drake | H04L 9/0838 |
| 2018/0053252 | A1* | 2/2018 | Koltnow | G06Q 40/025 |
| 2019/0087848 | A1* | 3/2019 | Koltnow | H04W 4/021 |

OTHER PUBLICATIONS

H. Ho, S. Fong and Z. Yan, "User Acceptance Testing of Mobile Payment in Various Scenarios," 2008 IEEE International Conference on e-Business Engineering, 2008, pp. 341-348, (Mobile Payments) (Year: 2008).*

H. Ho, S. Fong and Z. Yan, "User Acceptance Testing of Mobile Payment in Various Scenarios," 2008 IEEE International Conference on e-Business Engineering, 2008, pp. 341-348, doi: 10.1109/ICEBE.2008.70. (Mobile) (Year: 2008).*

F. S. Park, C. Gangakhedkar and P. Traynor, "Leveraging Cellular Infrastructure to Improve Fraud Prevention," 2009 Annual Computer Security Applications Conference, 2009, pp. 350-359, (Prevention) (Year: 2009).*

* cited by examiner

700

COMPARES, AT THE COMPUTER SYSTEM, THE LOCATION INFORMATION FROM THE POSITIONING SYSTEM WITH OTHER LOCATION INFORMATION PROVIDED ON THE CREDIT APPLICATION
710

MAKES, AT THE COMPUTER SYSTEM, A RISK ASSESSMENT BASED ON A RESULT OF THE COMPARING
720

FIG. 7

CAPTURABLE CODE FOR AUTOMATICALLY FORMATTING AND ADDRESSING A TEXT MESSAGE TO APPLY FOR AN OFFER

CROSS-REFERENCE TO RELATED APPLICATIONS (PROVISIONAL)

This application claims priority to and benefit of U.S. Provisional Patent Application No. 62/818,038 filed on Mar. 13, 2019, entitled "CAPTURABLE CODE FOR AUTOMATICALLY FORMATTING AND ADDRESSING A TEXT MESSAGE TO APPLY FOR AN OFFER" by Anderson et al., and assigned to the assignee of the present application, the disclosure of which is hereby incorporated by reference in its entirety.

BACKGROUND

Company specific, brand specific or even store specific credit accounts provide significant value to both customer and provider. By issuing a store specific credit account, the provider is able to tailor rewards offers, provide loyalty discounts and maintain customer brand loyalty. Similarly, the customer receives the perks from the reward offers and the loyalty discounts. In addition, a customer receiving rewards and discounts is more likely to recommend the credit account to friends via word of mouth, social networks, internet rating sites, and the like.

BRIEF DESCRIPTION OF THE DRAWINGS

The accompanying drawings, which are incorporated in and form a part of this specification, illustrate various embodiments and, together with the Description of Embodiments, serve to explain principles discussed below. The drawings referred to in this brief description should not be understood as being drawn to scale unless specifically noted.

FIG. 7 is a flowchart of a method for using position location information to verify information on a credit application, in accordance with an embodiment.

DESCRIPTION OF EMBODIMENTS

Figure 1A:
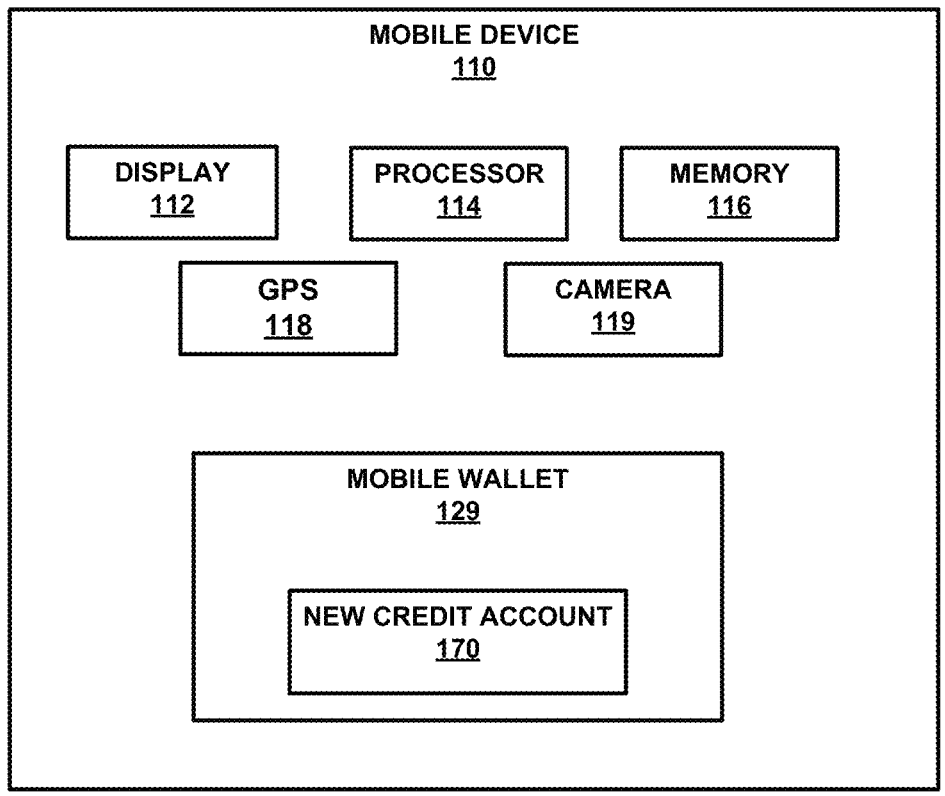
FIG. 1A is a block diagram of a mobile device, in accordance with an embodiment.

Reference will now be made in detail to embodiments of the subject matter, examples of which are illustrated in the accompanying drawings. While the subject matter discussed herein will be described in conjunction with various embodiments, it will be understood that they are not intended to limit the subject matter to these embodiments. On the contrary, the presented embodiments are intended to cover alternatives, modifications and equivalents, which may be included within the spirit and scope of the various embodiments as defined by the appended claims. Furthermore, in the Description of Embodiments, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

Notation and Nomenclature

Unless specifically stated otherwise as apparent from the following discussions, it is appreciated that throughout the present Description of Embodiments, discussions utilizing terms such as "selecting", "outputting", "inputting", "providing", "receiving", "utilizing", "obtaining", "updating", "accessing", "changing", "deciding", "determining", "interacting", "searching", "pinging" or the like, often refer to the actions and processes of an electronic computing device/system, such as a desktop computer, notebook computer, tablet, mobile device, and electronic personal display, among others. The electronic computing device/system manipulates and transforms data represented as physical (electronic) quantities within the circuits, electronic registers, memories, logic, and/or components and the like of the electronic computing device/system into other data similarly represented as physical quantities within the electronic computing device/system or other electronic computing devices/systems.

Overview

In general, "application abandonment" occurs when an applicant needs to fill out an application and the applicant stops filling out the application before providing all of the needed information. The more questions on an application that require an applicant's response, the more likely that the applicant will abandon the application before completion. Thus, if the application is prepopulated with information, there will be fewer blanks for the applicant to fill in. Fewer blanks will allow the applicant to complete the application before becoming frustrated, distracted, overwhelmed, or the like. As such, the percentage of applicants that complete the application form is inversely related to the number of keystrokes required by the applicant to complete the application.

The discussion provides a novel approach for seamlessly applying for and obtaining a new credit account, for performing an account lookup, a rewards lookup, determining a store attribution, or the like. Moreover, after obtaining information about the customer, that information can be used to pre-populate an application form that is accessible via a customer's mobile device. In other words, many fields in an application will be pre-populated, which will reduce the amount of information that a customer must manually input.

In one embodiment, as will be described herein, a mobile credit acquisition with form population that differs significantly from the conventional customer credit account application processes is disclosed. In conventional approaches, when filling out the forms to apply for credit, the customer must key in a significant amount of information such as name, address, device number, birthday, identification number, etc. Such conventional approaches are error prone, tedious, time-consuming, and often times a user will abandon the application process before it is completed.

In addition, because the scanning of the capturable code causes the text message to be addressed, any typo's that might occur during the user inputting the short code are removed. For example, if the offer requires a text to 74747, and the user types in a wrong number as the text address, e.g., 47474, 77447, etc., the user never actually responded to the offer and the opportunity would be missed. Similar mistakes could be made if an associate is providing the short code. They could provide a wrong short code, are misheard, etc. By having the capturable code cause the text message (or email message, the opening of an app, the downloading of an app, etc.) to be generated and addressed, any typographical mistake with respect to the short code is completely removed from the procedure.

Instead, the present embodiments, as will be described and explained below in detail, provide a previously unknown procedure for interacting with a capturable code (e.g., a 1D code, 2D code, 3D code, sound code, picture code, video code, etc.) with a camera, microphone, via near field communication (NFC), or other capture capability on the user's mobile device. The result of the user's mobile device interacting with a capturable code is the generation of a text message that is formatted and addressed (e.g., a text number or other short code) to deliver the text message to the credit account offeror. By having the capturable code automatically generate and format a text message, the user is saved the time required to open and address the text message.

Moreover, since the text message (or other electronic message) is formatted from instructions provided in the capturable code, the initial generated text message will include the information the capturable code requested. Such information could include a request for user ID information, a request for device ID information, a generation of metadata associated with the text message that includes device ID information, location information, user ID information, etc. As discussed below, the automatic generation of the text message from the scanning of the capturable code could include automatic insertion of one or more pieces of information, a request for authorization to send the email with the automatically inserted information, a request for manual input of one or more of the pieces of information, a combination of automatic and manually input information, etc.

Thus, the disclosed embodiments reduce clerical errors that could cause a non-response to an offer and further reduce the amount of data a customer has to key into their mobile device by formatting and addressing the text message, locating the customer's name, address and other personal information via automated searches, and prepopulating the application with the information found during the search. Thus, embodiments of the present invention provide a streamlined method for mobile credit acquisition which extends well beyond what was previously done by hand.

Importantly, the embodiments of the present invention, as will be described below, the various embodiments of the present invention do not merely implement conventional mobile credit acquisition processes on a computer. Instead, the various embodiments of the present invention provide a novel process for mobile credit acquisition with form population which is necessarily rooted in computer technology to overcome a problem specifically arising in the realm of digital customer key fatigue.

Moreover, the embodiments do not recite a mathematical algorithm; nor do they recite a fundamental economic or longstanding commercial practice. Instead, they address a business challenge that has been born in the Internet-centric environment in order to overcome numerous problems specifically arising in the realm of credit application and acceptance. In so doing, significant steps are removed from the customer's responsibility and the customer's time is saved.

Further, the disclosed embodiments provide an increased fraud protection due to obtaining the customer information used in the application from a reliable source and auto-filled into the application for the credit account.

In the following discussion, the term credit application is utilized. In general, a credit application obtains identification information about an applicant and uses the identification information to make a credit determination. For example, if a customer wants to obtain a credit account, the customer would have to provide, among other things, identifying information such as, name, current address, current employer, etc. The identifying information is used to perform a credit check on the customer's credit history and qualifications based on the credit issuer's selection criteria. In one embodiment, the check may occur at one or more of a number of possible credit reporting agencies.

In one embodiment, prior to accessing user information, the user affirmatively "opts-in" to the services described herein. For example, during the credit application process, the user is prompted with a choice to affirmatively "opt-in" to various services. As a result, any information is obtained with the user's prior permission, in accordance with applicable laws. Moreover, depending on present or future credit account laws, rules and regulations, the credit application aspects described herein may be more or less formal.

In one embodiment, if the application is mobile web based instead of a mobile app, the mobile web may not be able to access the GPS data on the mobile app. However, the mobile web may be able to use the location information provided by the communication provider (carrier) to obtain location data that is similar to the mobile device GPS data. One way to obtain the information would be to use an API to push the carrier information to the mobile web application.

In one embodiment, the application is a non-integrated application, e.g., custom code is hosted and managed by credit account provider. In one embodiment, the application is an integrated application, e.g., it provides a brand the structure of the front end such that the brand can host and modify the front end based on their own individualized criteria, while the back end remains hosted and managed by the credit account provider. In one embodiment, the application is a hybrid, e.g., the credit account provider will host and manage but they will receive front end input/design/criterion from the brand that will be used by the credit account provider to customize the front end for the brand while both the front end and the back end remain hosted and managed by the credit account provider.

Operation

Referring now to FIG. 1, a block diagram of a mobile device 110 is shown. Although a number of components are shown as part of mobile device 110, it should be appreciated that other, different, more, or fewer components may be found on mobile device 110.

In general, mobile device 110 is a mobile device, a smart device, a tablet, a smart watch, a piece of smart jewelry, smart glasses, or other user portable devices having wireless telephony connectivity via a mobile service provider. In one embodiment, mobile device 110 is also capable of broadcasting and receiving via at least one network, such as, but not limited to, WiFi, Bluetooth, NFC, and the like. In one embodiment, mobile device 110 includes a display 112, a processor 114, a memory 216, a GPS 218, a camera 119, and the like.

Mobile device 110 also includes a mobile wallet 129 which is an electronic application that operates on mobile device 110. Mobile wallet 129 includes new credit account 170. In general, new credit account 170 allows a customer to utilize a single mobile payment method that is linked to one or more credit account information, reward account information, offers, coupons, and the like, and is carried in a secure digital form on a mobile device 110. Instead of using a physical plastic card to make purchases, a mobile wallet allows a customer to pay via mobile device 110 in stores, in apps, or on the web.

GPS 218 can generate and provide location information with respect to the customer's mobile device. The output from GPS 218 could be utilized by an operating system of mobile device 110, an application (app) loaded on mobile device 110, a web based app accessed over a network by mobile device 110, or the like. In one embodiment, the output from GPS 218 could be provided to another computing system for identification purposes, fraud determination/evaluation, etc. In one embodiment, instead of providing GPS information, the location of mobile device 110 may be determined within a given radius, such as the broadcast range of an identified beacon, a WiFi hotspot, overlapped area covered by a plurality of mobile telephone signal providers, or the like.

Figure 1B:
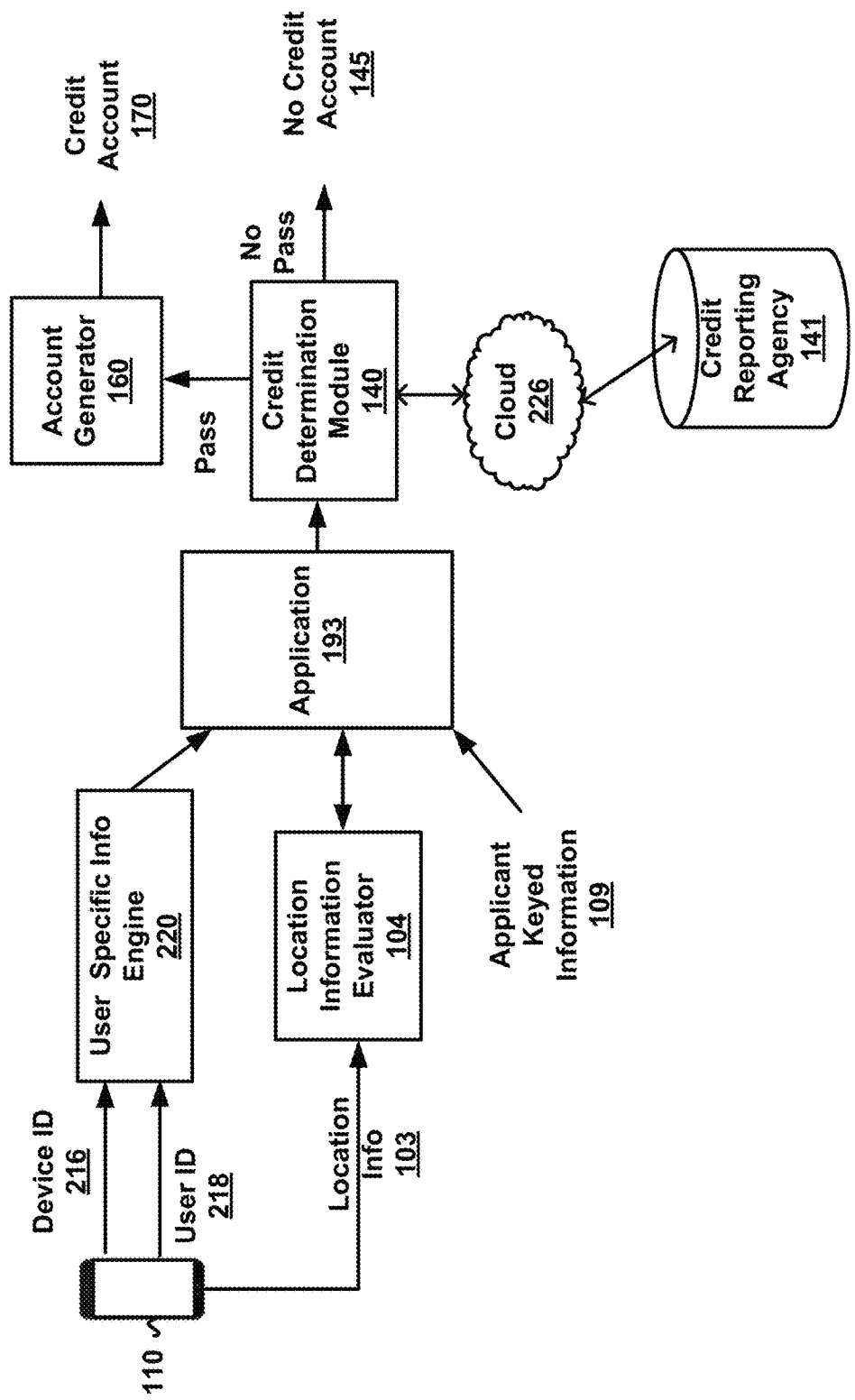
FIG. 1B is a block diagram of a system to pre-populate and verify information on a credit application, in accordance with an embodiment.

With reference now to FIG. 1B, a block diagram of a system 166 for obtaining and verifying information on a credit application 193 is shown in accordance with an embodiment. System 166 includes a mobile device 110, location information 103, applicant keyed information 109, location information evaluator 104, user specific information engine 220, and application 193.

Application 193 is initiated when the user interacts with a capturable code (e.g., a 1D code, 2D code, 3D code, sound code, picture code, video code, etc.) with a camera (or microphone, or other capture capability) on the user's mobile device 110. In general, 2D codes include items such as, but not limited to, visual images, QR code, and the like. The result of the interaction with the capturable code is the generation of a text message that is formatted and addressed (e.g., a text number or other short code) to deliver the text message to the credit account offeror. By having the capturable code automatically generate and format a text message, the user is saved the time required to open and address the text message.

In one embodiment, the location information 103 could be the location of the mobile device. In one embodiment, the location of the mobile device can be determined via geofence, beacon range, a ping, NFC, WiFi, or the like. Moreover, the location may be an actual location or a relative location.

For example, actual location information may be obtained by the user's mobile device location services, such as but not limited to, GPS, WiFi, cellular service, beacon derived location determination, and the like. Moreover, the location determination can be useful even at differing levels of accuracy. For example, a GPS enabled mobile device would provide location information that is accurate to within a few meters and would be lat long coordinates (or similar).

In contrast, relative location information is location information determined via a broadcasting or receiving station (e.g., cellular service, beacon, WiFi access point, hotspot, or the like). The relative location would be the location of the station and a broadcast radius (or area) of coverage for the station. Moreover, if the device is picked up by two or more different stations, then the location could be further refined as being within the overlapping broadcast radii of the number of different stations. For example, although the actual location of the mobile device may not be known, if the mobile device is interacting with a beacon X, then the relative location of the mobile device would have to be in range of beacon X broadcast radius. Similarly, a geo-fence could be used to determine that the location of the mobile device is within the defined geo-fenced area, although the actual location of the mobile device within the geofenced area may not be known.

In one embodiment, mobile device 110 will use a positioning determining system such as GPS 118, a location app operating thereon, or the like to determine location information 103. In another embodiment, the mobile device may be able to determine a location within a given radius, such as the broadcast range of a beacon, WiFi hotspot, overlapped area covered by a plurality of mobile phone signal providers, or some combination thereof.

Location information 103 refers to the location of the mobile device 110 at different times of the day as generated by a positioning system on the mobile device 110, by location information on the user's home computer system or the like. Because of the different positioning systems available on a mobile device, the location information 103 can include differing levels of accuracy. For example, a GPS enabled mobile device 110 can provide location information 103 that is accurate to within a few meters or less. In contrast, location information 103 derived from cellular service, beacon, WiFi location capabilities, and the like can provide a location radius or location area that may be within 10-50 meters or even larger.

Location information evaluator 104 uses location information 103 to determine an actual address. For example, in one embodiment, the location information 103 provided by mobile device 110 are provided as coordinates data. In order to determine an address, location information evaluator 104 cross-references the coordinate data with one or more different coordinate-to-address determination sources such as: mapping software, surveyor data that includes business and/or residential information, County assessor's information, or other coordinate-to-address determiners. Further operation of location information evaluator 104 is shown and described in FIG. 5.

User specific information engine 220 receives a device ID 216 and/or a user ID 218 and utilizes the ID's to obtain user specific information to prepopulate application 193. The operation of user specific information engine 120 is discussed in more detail in the discussion of FIGS. 2A-2B.

Applicant keyed information 109 refers to information that is keyed/typed or otherwise input into application 193 by the user.

In one embodiment, the location information determined by location information evaluator 104, and the user specific information provided by the user specific information engine 220 is prefilled into the application 193. By pre-populating application 193 prior to presenting it to the applicant, the abandonment rate will be improved as the application 193 completion process is reduced. Moreover, the amount of required applicant keyed information 109 will be reduced.

In general, credit determination module 140 accesses a credit reporting agency 141 via cloud 226 to determine credit information for the user based on the application information. An example of cloud 226 is a network such as described herein. The credit reporting agency 141 may be a company such as, but not limited to, Experian, Equifax, TransUnion, Innovis and the like.

Credit determination module 140 will analyze the user's credit information provided by credit reporting agency 141 to determine if the user passes the criteria established to obtain a credit account. In one embodiment, credit determination module 140 will also determine a credit account limit. For example, the credit account limit may be 1000.00 USD.

If the user does not pass the criteria established to obtain a credit account, no credit account 145 is established and no further action is taken.

If the user does meet the credit criteria established to obtain a credit account, the applicant's information is passed to account generator 160 and a credit account 270 is generated. In one embodiment, credit account generator 160 provides a digital credit account 270 identifier to the mobile device. In one embodiment, the digital credit account identifier is instantly available to be used as a form of payment.

One example of a digital credit account identifier is a temporary shopping pass presented on the display of the mobile device. In one embodiment, the temporary shopping pass includes aspects such as: the user's name, credit limit, store card account number, terms of use for the temporary shopping pass, a rotating GIF to prevent screenshots from being accepted at POS, a banner asking customer to present their ID to the associate to use the temporary account, and the like. These are shown in further detail in FIG. 4F.

Figure 2A:
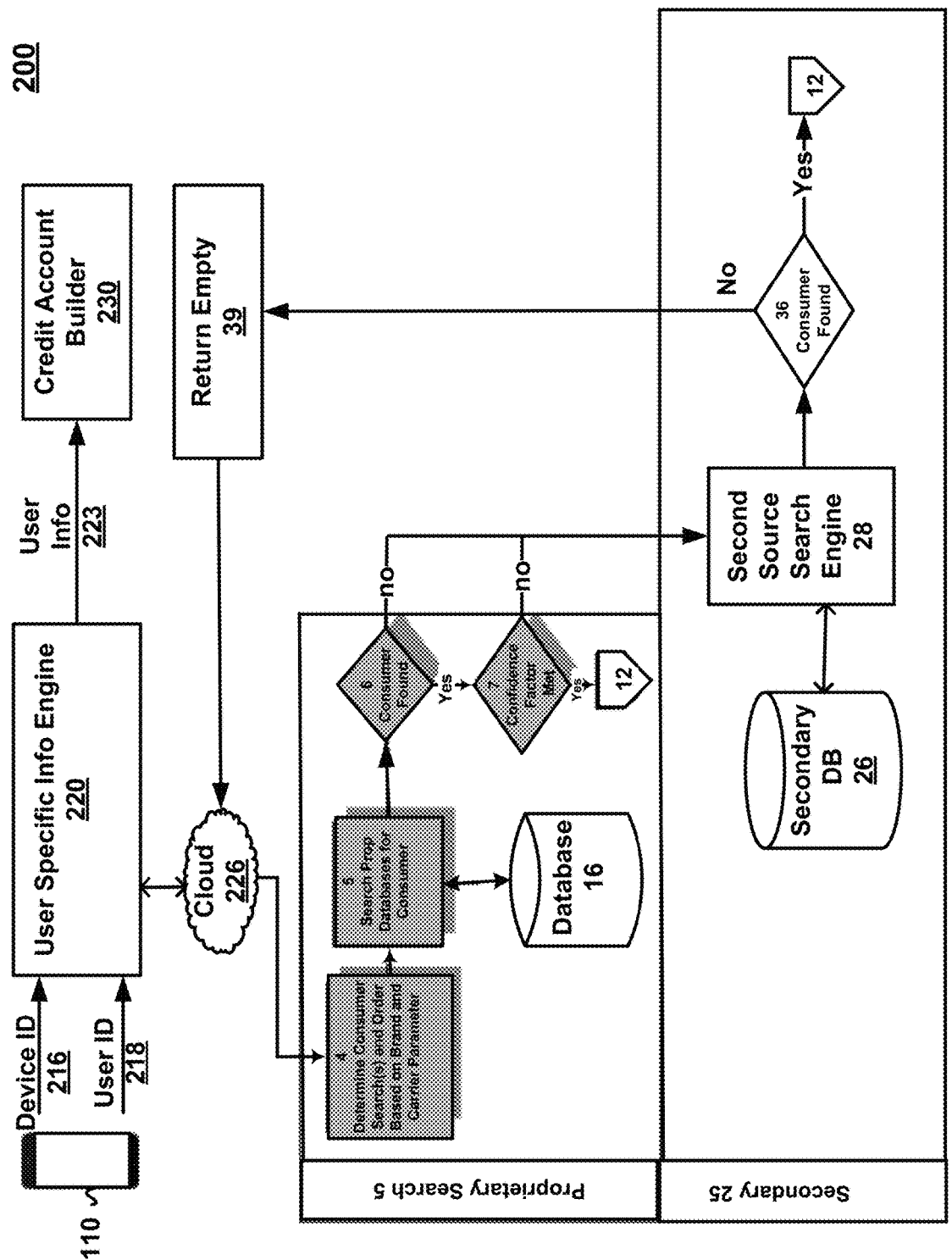
FIG. 2A is a block diagram of a user specific information engine accessing one or more different search locations, in accordance with an embodiment.

Referring now to FIG. 2A, a block diagram of a mobile credit acquisition system 200 is shown in accordance with an embodiment. In one embodiment, mobile credit acquisition system 200 includes a credit application 193, a user specific information engine 220, and a credit account builder 230. Although a number of applications and components are shown in mobile credit acquisition system 200, it should be appreciated that the components and applications may be located separately from one another. For example, one or more of the components and applications may be found on one or more locations, such as, but not limited to, a computer in the retail store, a server at a remote location, on the cloud 226 or the like.

In one embodiment, a capturable code 405 is used to initiate an embodiment. Although a 2D capturable code 405 is shown, in one embodiment capturable code 405 is selected from a group of one or more of a 1D code, 2D code, 3D code, sound code, picture code, video code, captured with a camera, a microphone, captured via near field communication (NFC), or other capture capability on the user's mobile device. For purposes of clarity, in one embodiment, instead of capturable code 405, an NFC 404 could be used as the initiator. For purposes of clarity, the following discussion will utilize capturable code 405 as a generic.

In one embodiment, a number of different options may be available to respond to the capturable code 405. For example, the response may be in the form of a message interaction such as shown and described in further detail in FIGS. 4A through 4C. In one embodiment, the response to the capturable code 405 includes providing the mobile device ID 216. In another embodiment, the response to the capturable code 405 includes providing the mobile device ID and the user ID 218.

In general, device ID 216 can be different depending upon the device. For example, a mobile device ID includes identification characteristics such as, a mobile device telephone number or mobile device ID such as the mobile device's serial number, international mobile equipment identity (IMEI), integrated circuit card identifier (ICCID) (e.g., the SIM card number), mobile equipment identifier (MEID), secure element chipset identify (SEID), a media access control (MAC) address, Internet protocol (IP) address, universal unique identifier (UUID), model number, product number, serial number, or the like.

In one embodiment, device ID 216 that is requested for the process is based upon an evaluation of which of the possible device ID's would provide the best capability for fraud prevention. For example, a user's mobile number could be easily obtained (e.g., via social media, public records, white pages, Internet search, etc.) so it would be a lower device ID option on a fraud scale. In contrast, the user's mobile device serial number, IMEI, ICCID, MEID, SEID, or the like is much less likely to be obtained fraudulently (via social media, public records, guessed, etc.) so it may be that one of the IMEI, ICCID, MEID, SEID, or the like would be the device ID with the highest fraud prevention value.

User ID 218 can be the user's identification information such as, name, zip code, social security number or a portion thereof, driver's license number or a portion thereof, or the like that is used to identify a specific user.

In one embodiment, the user ID 218 that is requested for the process is based upon an evaluation of which the possible user ID's would provide the best capability for fraud prevention. For example, a user's birthday could be easily obtained (e.g., via social media, public records, etc.) so it would be a lower user ID option on a fraud scale. Similarly, a user's address could be easily obtained (e.g., via social media, public records, etc.) so it would also be a lower user ID option on a fraud scale. Further, a user's email could be easily obtained (e.g., via social media, public records, etc.) or easily guessed, so it would also be a lower user ID option on a fraud scale. In contrast, a social security number (or last four, six, seven, five, middle three, five, first 6, 7; middle three+last two; or any other amount or combination of the nine social security numbers) is much less likely to be obtained fraudulently (e.g., via social media, public records, guessed, etc.) so it may be that a pre-selected portion of the SSN (or a changing selected portion of the SSN) would be the user ID with the highest fraud prevention value.

Thus, a user's response to capturable code 405 will include enough information for the mobile credit acquisition system 200 to perform a credit account qualification of the user for purposes of providing the user with a new credit account.

In one embodiment, user specific information engine 220 will receive a message from a user's mobile device 110 in response to the text sent by mobile device 110. In one embodiment, the message will include the device ID 216. In one embodiment, the message will include the user ID 218. In one embodiment, the message will include both the device ID 216 and user ID 218.

In one embodiment, user specific information engine 220 will use device ID 216 and/or user ID 218 to obtain user specific information 223 to prepopulate an electronic form such as a credit application. In general, user specific information 223 could be at least two of: a name and full or partial address, a driver's license number, a social security number, or the like.

For example, user specific information engine 220 may access the different search locations via the cloud 226. An example of cloud 226 is a network such as the Internet, local area network (LAN), wide area network (WAN), or the like.

One embodiment uses the device ID 216 and/or user ID 218 information to perform a proprietary search 5 of at least one proprietary database 16. In general, the proprietary database 16 may be one or more databases such as a credit accounts database, or the like, that store a company's private database such as an Alliance Data Legacy database or the like. Proprietary database 16 will include user specific information 223 for customers that have existing accounts with the company, have previously applied for an account, or the like.

In one embodiment, the proprietary search 5 will only search a database related to a specific company. For example, if the credit account builder is a specific company, e.g., Nash's skate and bike emporium, then in a company specific database search, only the existing customer information related to Nash's skate and bike emporium will be searched. For example, a check is performed to see if the customer has an existing brand account, e.g., is already an existing customer in the database.

However, if the proprietary search 5 is for a group of companies, a shared information database, or the like, then all of the customer information in the databases may be searched for a match with the device ID 216 or the user ID 218. For example, if the database includes Nash's skate and bike, Mike's hardware, and Tarrin's dress stores, and all three companies are sharing information, then the search would encompass all three store's databases of information.

For example, search an internal accountholder database 16 to see if the customer has another account within the shared information database. For example, if the customer does not have a Nash's skate and bike account, the underlying credit account, e.g., Alliance Data database, is searched to see if the customer has an account at a different brand associated with Alliance Data.

In one embodiment, customer information 6 that is found in the proprietary database 16 will be verified using a confidence factor 7. For example, if only one record is found and it is 5 days old, the confidence in the found records would likely be below a confidence threshold. In contrast, if 2 years of records are found, such as prior accounts, present accounts, memberships, rewards information, and the like, then the confidence in the user specific information 223 found in the records would be above the confidence factor threshold. If the user specific information 223 is above the confidence threshold, then the user specific information 223 is deemed valid. At that point, the user specific information 223 is returned via return information 12 to user specific info engine 220 and then passed on to credit account builder 230.

One embodiment incorporates one or more of several fraud mitigation business rules to attempt to prevent fraudulent activity; e.g., to validate the found records. These business rules include logic that looks at specific activity on a customer's account that point to potentially fraudulent activities. In addition, a fraud mitigation tool may be implemented. The fraud mitigation tool will use device and internet protocol (IP) information to predict if the credit application can be trusted or will eventually become fraudulent.

For example, in one embodiment, the fraud mitigation tool will ignore any credit accounts that meet situations such as, but not limited to, the following: It is associated within a brand(s) that have been determined to have a high propensity for fraud. It is currently in a derogatory status. The account was opened within a defined number of days, where the number of days is controlled by internal parameters and can be tightened, loosened or turned off. The device number matched has been changed within a defined number of days, where the number of days is controlled by internal parameters and can be tightened, loosened or turned off. An authorized buyer has been added to the account within a defined number of days, where the number of days is controlled by internal parameters and can be tightened, loosened or turned off. The address has been changed within a defined number of days, where the number of days is controlled by internal parameters and can be tightened, loosened or turned off. The account has been inactive within a defined number of months, where the number of months is controlled by internal parameters and can be tightened, loosened or turned off. Multiple accounts are found for the mobile device number, zip code and last 4 digits of the SSN but all accounts are not the same person, and the like.

If no user specific information 223 is found during the proprietary search 5 or if the found user specific information 223 cannot be validated, then the device ID 216 and user ID 218 are passed on to a secondary search 25. At secondary search 25, a second source search engine 28 will search at least one secondary source database 26. One example of secondary source database 26 is a reverse device number look up such as reverse device look-up. However, other secondary source databases may be searched such as, but not limited to: social media sites, search engines, online public and/or private records, reverse name and device number engines, and the like. In one embodiment, the user specific information 223 may be obtained by performing a secondary source database 26 search with the user ID 218 and the device ID 216.

In one embodiment, the secondary search 25 may be for example, a real-time call to a reverse device look-up product to try and locate the customer. In general, reverse device look-up products provide accurate and current customer telephone information. In many cases, the data is updated regularly from a broad range of sources, including regional bell operating companies, white pages and proprietary sources. One embodiment also integrates validation and authentication aspects that add further benefits to append address information for a customer. In general, validation and authentication aspects match customer name and zip code information that was returned from the reverse device look-up, against data from a secondary source to return full address data.

If customer information 36 is found, then the user specific information 223 is returned via return information 12 to user specific info engine 220. If no user specific information 223 is found from the secondary search 25, then no user specific information 223 will be pre-populated into the forms. That is, the user specific info engine 220 will receive a return empty 39. However, if a match is made, then the user specific information 223 can be used to pre-populate a portion of the application, e.g., name, address, city, state, zip, mobile device number, email, etc.

This is a benefit of the mobile credit acquisition with form population capability. Utilizing the form population reduces the amount of data a customer has to key by locating the customer's name and address via automated searches.

In one embodiment, when a customer has to enter or change their address and begins to type their address, a search is invoked that returns a list of potential results based on the zip code that was entered in the initial user experience. As more characters are typed, the picklist is refined to display closer matches. When the address is selected, it will be checked for completeness and the associated city and state will be auto pre-filled.

Figure 2B:
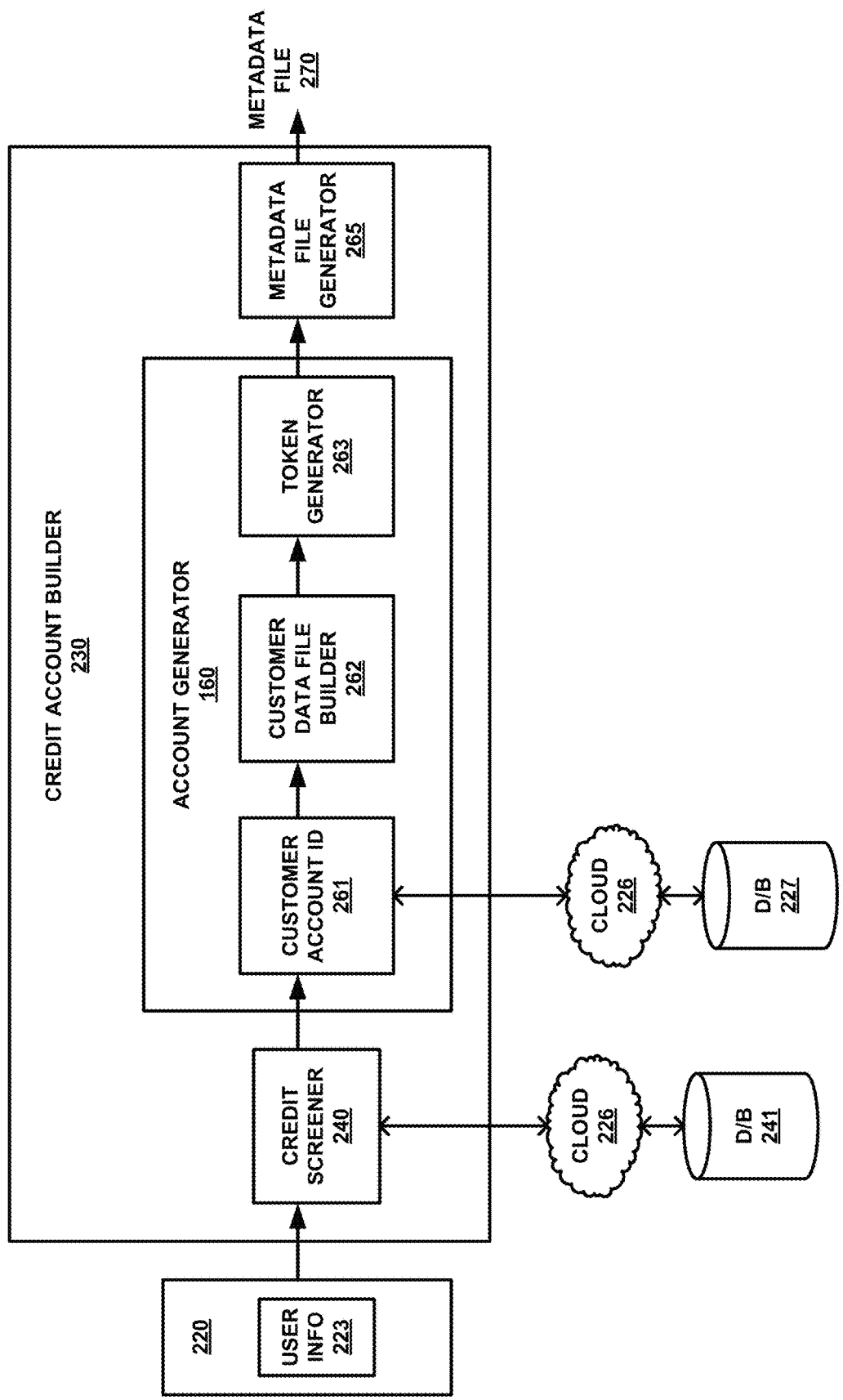
FIG. 2B is a block diagram of a system for adding a new credit account with purchase capability to a mobile wallet, in accordance with an embodiment.

Referring now to FIG. 2B, a block diagram of a system 250 for adding a new credit account with purchase capability to mobile wallet 129 of a customer's mobile device 110 is shown in accordance with an embodiment. In one embodiment, system 250 shows the user specific information engine 220 providing the user specific information 223 to credit account builder 230 is shown in accordance with one embodiment. In one embodiment, credit account builder 230 includes a credit screener 240, a new credit account generator 160, and a metadata file generator 265. Although a number of applications and components are shown, it should be appreciated that there may be more or fewer components and applications of credit account builder 230. Moreover, different pieces may be combined, re-organized, located separately from one another, or the like.

In general, credit screener 240 accesses a database 241, such as a credit reporting agency, via cloud 226 to determine credit information for the user based on the user specific information 223. An example of cloud 226 is a network such as described herein. The credit reporting agency could be a company such as, but not limited to, Experian, Equifax, TransUnion, Innovis and the like.

Credit screener 240 will analyze the user's credit information obtained from the credit reporting agency database 241 to determine if the user passes a credit criteria. If the user does not pass the credit screening process, no further action is taken by mobile credit acquisition system 250.

In one embodiment, after the user passes the credit screening then credit account builder 230 provides an application for a credit account to the user's mobile device. In one embodiment, credit account builder 230 populates the application for a credit account with the user specific information 223 as shown in 437 of FIG. 4C. That is, credit account builder 230 will place the user specific information 223 provided by the user specific information engine 220 into the forms that are provided to the user's mobile device. By populating the forms prior to presenting them to the user, the abandonment rate will be improved as the application process will be shortened due to the pre-filling of the customer's information into the application forms.

Figure 8:
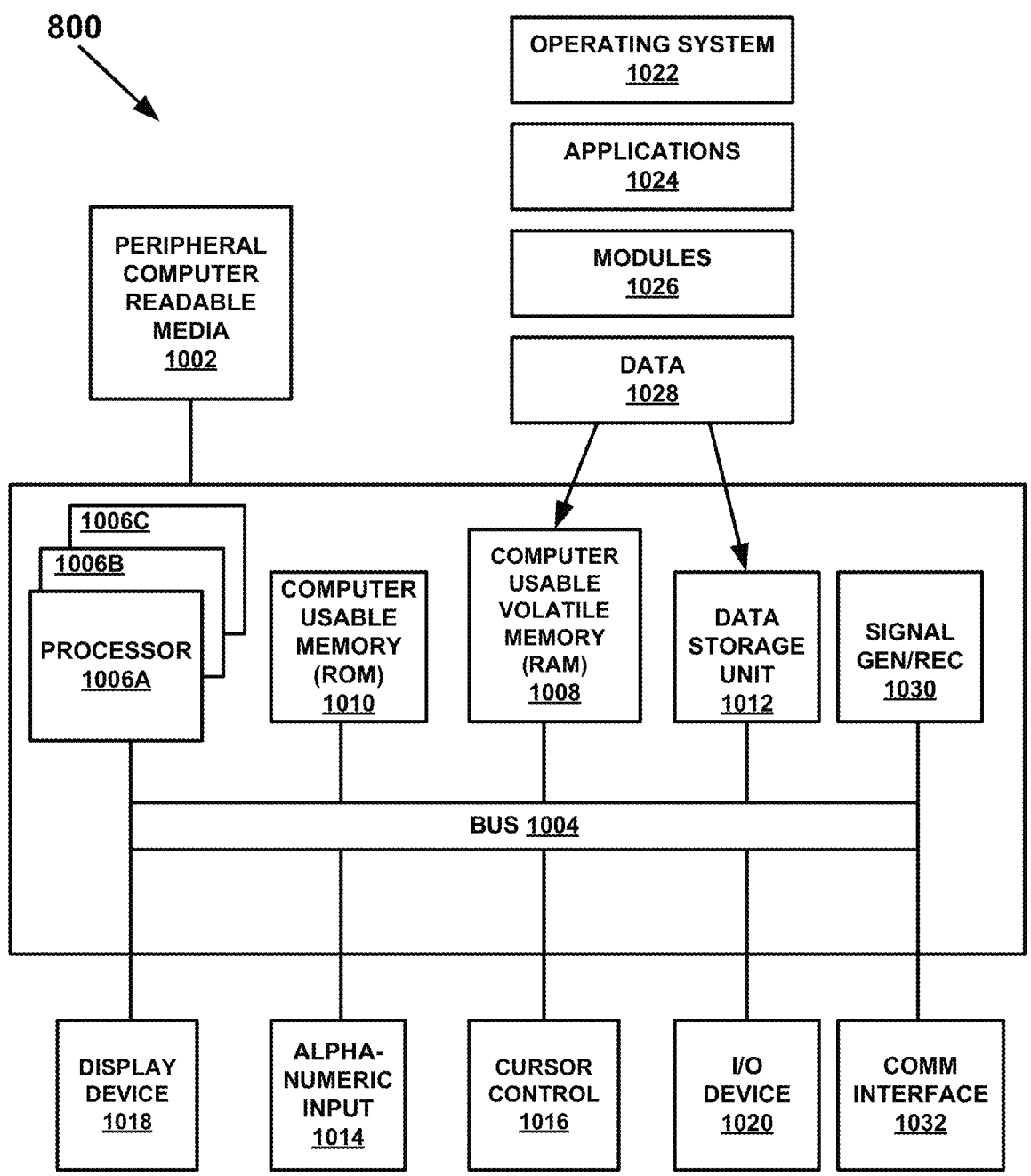
FIG. 8 is a block diagram of an example computer system with which or upon which various embodiments of the present invention may be implemented.

In one embodiment, credit account builder and/or new credit account generator 160 are computing systems similar to computer system 800 described in detail in the FIG. 8 discussion herein. In one embodiment, new credit account generator 160 includes a customer account identifier 261, a customer data file builder 262, a token generator 263, and a metadata file generator 265.

In one embodiment, once the user completes the new credit account application, new credit account generator 160 will receive the information in the new credit account application from credit screener 240.

In one embodiment customer account identifier 261 accesses database 227 which stores a plurality of customer credit accounts and utilizes the user specific information 223 in order to identify any other accounts related to the customer. In one embodiment, customer account identifier 261 accesses database 227 via cloud 226. An example of cloud 226 is a network such as the Internet, local area network (LAN), wide area network (WAN), or the like. Database 227 may include store specific data, brand specific data, retailer specific data, a shared database, a conglomerate database, a portion of a larger storage database, and the like. Moreover, database 227 could be a local database, a virtual database, a cloud database, a plurality of databases, or a combination thereof.

In one embodiment, database 227 stores a plurality of customer credit accounts, a plurality of customer reward accounts and/or offers, coupons, and the like. Customer account identifier 261 searches database 227 for one or more customer accounts (e.g., credit accounts, reward accounts, and/or offers, coupons, and the like) that are held by the identified customer. If any other customer accounts are found, they are provided by the customer account identifier 261 to customer data file builder 262 which links the one or more customer accounts with the new credit account information to build a customer data file.

Token generator 263 then generates a token identifying the customer data file. In one embodiment the token is an identification number, hash, or other type of anti-tamper encrypted protection that is generated as an identifier for the customer data file.

Metadata file generator 265 generates a metadata file 270 formatted for mobile wallet 129, the metadata file 270 including the new credit account 170 and the token. In one embodiment, the new credit account 170 could include an image and the token is embedded within the image data. In another embodiment, the token could be separate from the image that is presented when new credit account 170 is accessed and would be provided at the time of the transaction. For example, the token could be provided via a near field communication (NFC) between the mobile device 110 and the POS when new credit account 170 is presented at the POS. In another embodiment, the entire new credit account 170 metadata file 270 could be provided via NFC at the time of the transaction and no imagery would be obtained by the POS even if it was presented on the display 112. In one embodiment, metadata file 270 includes an instruction that causes the new credit account 170 to be placed in a first location of mobile wallet 129 on the customer's mobile device 110.

The metadata file 270 is then provided from the credit account builder 230 (e.g., a credit provider computer system, third-party computing system, or the like) to the customer's mobile device 110. The metadata file 270 is added to mobile wallet 129 on the customer's mobile device 110, wherein an access of the metadata file 270 in the mobile wallet causes the new credit account 170 to be presented by the customer's mobile device 110. In general, the presentation of new credit account 170 by the customer's mobile device 110 could be audible, visual, or the like, to provide payment at the time of a customer purchase as described herein. In one embodiment, new credit account 170 is instantly available to be used as a form of payment.

Figure 3A:
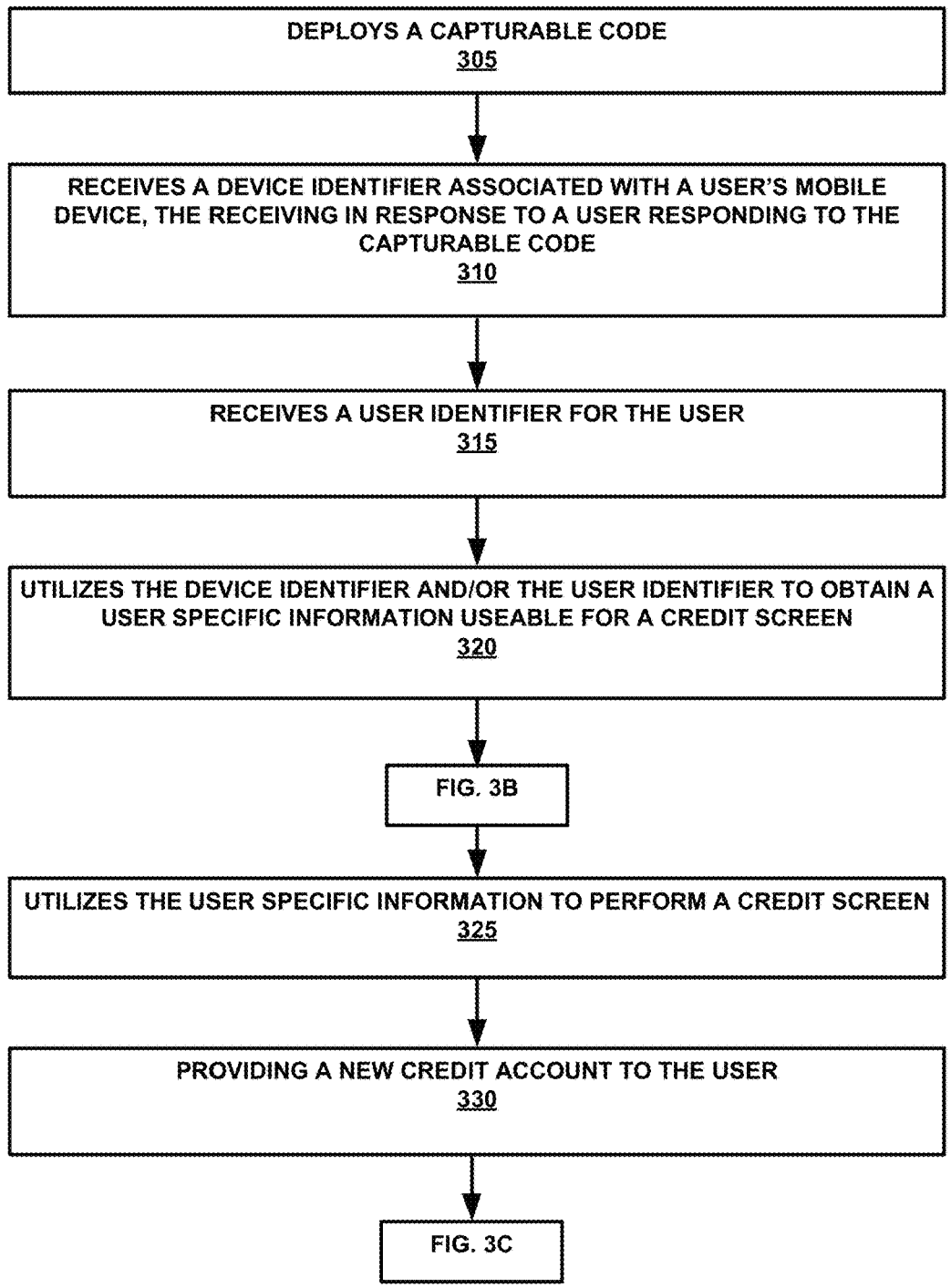
FIG. 3A is a flow chart of a method for mobile credit acquisition, in accordance with an embodiment.
Figure 4A:
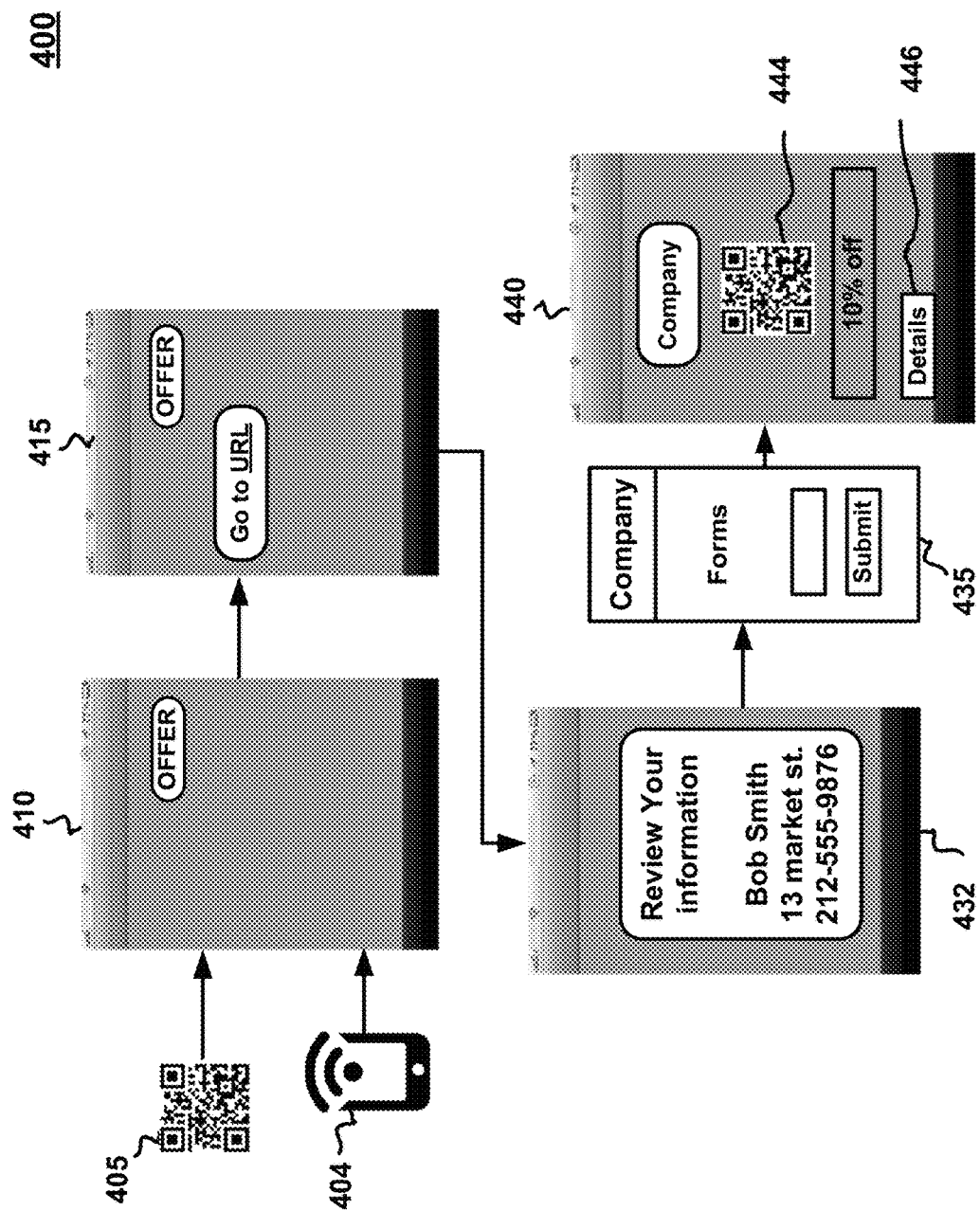
FIG. 4A is a block diagram of a mobile direct credit application as viewed on a user's mobile device, in accordance with an embodiment.
Figure 4B:
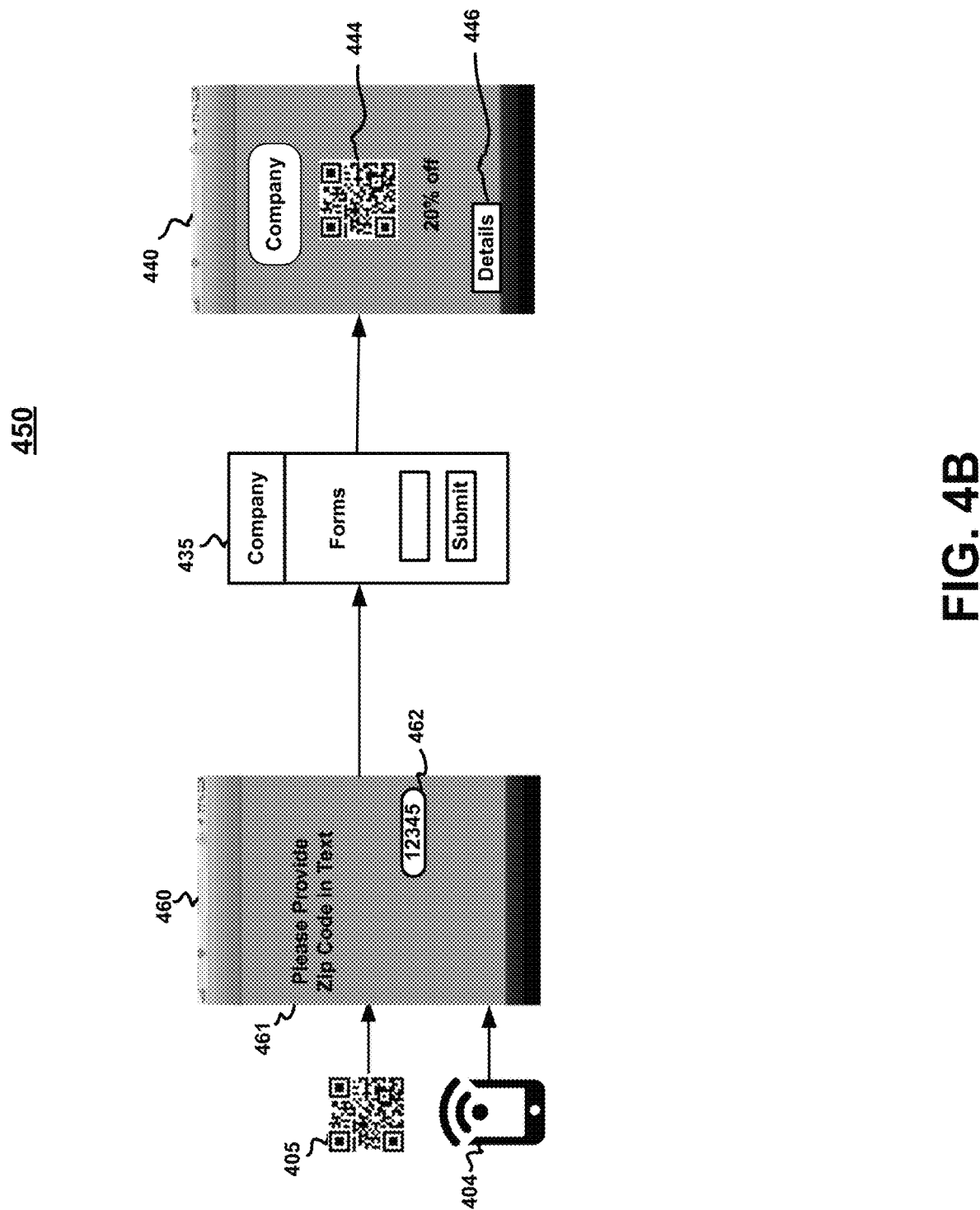
FIG. 4B is a block diagram of another embodiment for mobile credit acquisition as viewed on a user's mobile device, in accordance with an embodiment.
Figure 4C:
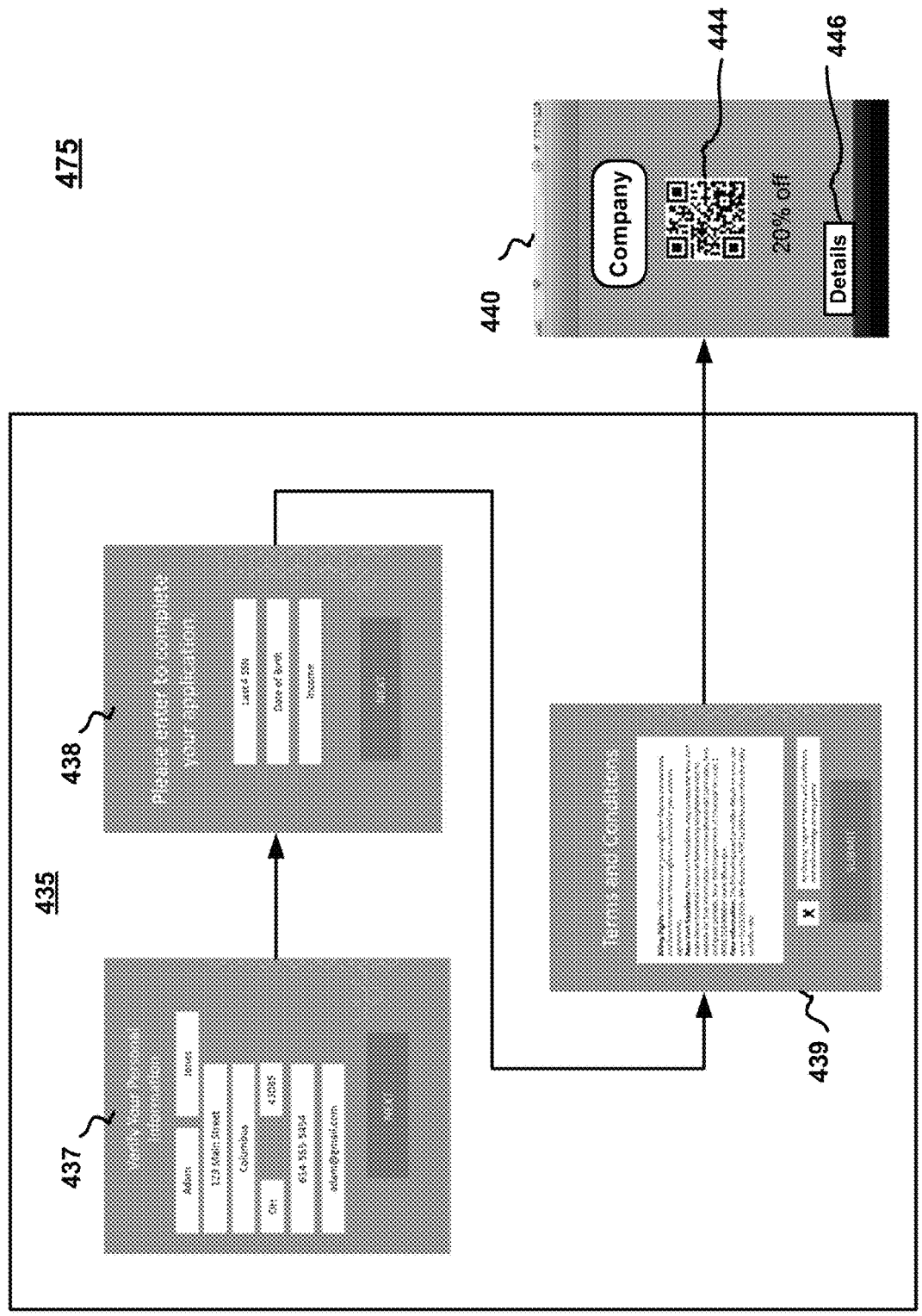
FIG. 4C is a block diagram of an embodiment for mobile credit acquisition having prepopulated form information as viewed on a user's mobile device, in accordance with an embodiment.

With reference now to FIG. 3A, a flowchart 300 of a method for mobile credit acquisition is shown in accordance with an embodiment. FIGS. 4A through 4C are also utilized to provide clarity and support for the discussion of flowchart 300. FIG. 4A is a block diagram 400 of a mobile credit acquisition as viewed on a user's mobile device shown in accordance with an embodiment. FIG. 4B is a block diagram 450 of a mobile direct credit application as viewed on a user's mobile device, in accordance with an embodiment. FIG. 4C is a block diagram 475 of an embodiment for mobile credit acquisition having prepopulated form information as viewed on a user's mobile device. Although the interactions between user's mobile device and the offeror are shown in the format of text messages, it should be appreciated that the interactions may be made via one or more of: a beacon broadcast, WiFi broadcast, email, text, SMS, social media alert, app alert, or the like.

Although the interactions between user's mobile device and the web-based application are shown in the format of text messages and screen captures, it should be appreciated that the interactions may be made via one or more of: a beacon broadcast, WiFi broadcast, email, text, SMS, social media alert, app alert, or the like.

With reference now to 305 of FIG. 3A, one embodiment deploys capturable code 405. In one embodiment, capturable code 405 is an offer to open a new credit account with the retailer, or the like. In one embodiment, capturable code 405 may be an offer to open a new reward account, or the like. The result of the user's mobile device 110 interacting with a capturable code 405 is the generation of a text message that is formatted and addressed (e.g., a text number or other short code) to deliver the text message to the credit account offeror. By having the capturable code 405 automatically generate and format a text message, the user is saved the time required to open and address the text message.

In addition, because scanning the capturable code 405 causes the text message to be addressed, any typo's that might occur during the user inputting the short code are removed. For example, if the offer requires a text to 74747, and the user types in a wrong number as the text address, e.g., 47474, 77447, etc., the user never actually responded to the offer and the opportunity would be missed. Similar mistakes could be made if an associate is providing the short code. They could provide a wrong short code, are misheard, etc. By having the capturable code 405 cause the text message (or email message, the opening of an app, the downloading of an app, etc.) to be generated and addressed, any typographical mistake with respect to the short code is completely removed from the procedure.

Moreover, since the text message (or other electronic message) is formatted from instructions provided in the capturable code 405, the initial generated text message will include the information the capturable code 405 requested. Such information could include a request for user ID information, a request for device ID information, a generation of metadata associated with the text message that includes device ID information, location information, user ID information, etc. As discussed below, the automatic generation of the text message from the scanning of the capturable code 405 could include automatic insertion of one or more pieces of information, a request for authorization to send the email with the automatically inserted information, a request for manual input of one or more of the pieces of information, a combination of automatic and manually input information, etc.

The capturable code 405 can be in-store, or out-of-store. In-store examples of the capturable code 405 could be a poster or other media on a wall in the store, a tri-fold or other media by a point-of-sale (POS), displayed on a screen in the store, displayed on an associate's tablet or other mobile device in the store, printed on the floor, etched in the glass, part of a sticker, etc.

Out-of-store examples of the capturable code 405 could be part of an email campaign sent to a user's email address, a piece of snail mail, a direct mail, a flyer, business card, or the like. The media could be sent to the user's home address (or work address, or placed in a public location, etc.), a poster or other media that is on a wall (or otherwise displayed) in a public location, an ad that is displayed on a TV or computer screen, an ad on a webpage, an ad that plays at an online video location, and the like.

With reference now to 310 of FIG. 3A, one embodiment receives a device identifier associated with a user's mobile device 110, received in response to a user responding electronically to the offer on the user's mobile device. As stated herein, device ID 216 includes device identification characteristics such as, a mobile device telephone number or mobile device ID such as the mobile device's serial number, IMEI, ICCID (e.g., the SIM card number), MEID, SEID, MAC address, IP address, UUID, model number, product number, serial number, or the like.

In one embodiment, device ID 216 that is requested for the process is based upon an evaluation of which of the possible device ID's would provide the best capability for fraud prevention. For example, a user's mobile number could be easily obtained (e.g., via social media, public records, white pages, Internet search, etc.) so it would be a lower device ID option on a fraud scale. In contrast, the user's mobile device serial number, IMEI, ICCID, MEID, SEID, or the like is much less likely to be obtained fraudulently (via social media, public records, guessed, etc.) so it may be that one of the IMEI, ICCID, MEID, SEID, or the like would be the device ID with the highest fraud prevention value.

For example, as shown in FIG. 4A at 405 the user interacts with capturable code 405 that requests a text be sent to 123 to apply for a new credit account.

At 410 when the user texts "offer" to 123, the user's device ID 216 will also be provided with the text metadata. In one embodiment, when the text message is generated (or sent, or received), it will include a device ID (e.g., phone number, or another device ID discussed herein) in the metadata (or otherwise provided with) of the text message. In so doing, the credit account provider will receive the text that includes the device ID which will then be used by the credit account provider to search for prescreen information about the user, prescreen the user, and if the user passes the prescreen, provide at least a partially pre-filled credit application to the user's mobile device.

With reference now to 315 of FIG. 3A, one embodiment receives a user identifier for the user. User ID 218 may be the user's zip code, social security number or a portion thereof, driver's license number or a portion thereof, or the like. In one embodiment, the text message will include a user ID (name, address, birthday, SSN, etc.) which is automatically obtained from the device and placed into the text message. In one embodiment, the user would have to authorize the user ID to be included before the message could be sent. When the text is sent, the credit account provider will receive the text that includes the user ID and the device ID which will then be used by the credit account provider to search for prescreen information about the user, prescreen the user, and if the user passes the prescreen provide at least a partially pre-filled credit application to the user's mobile device.

In one embodiment, the text message will include a user ID which is obtained from the user and is based on a request in the automatically formatted text message, e.g., what is your name? (or another user ID as described herein). In one embodiment, the user would have to authorize the user ID to be included before the message could be sent. When the text is sent, the credit account provider will receive the text that includes the user ID and the device ID which will then be used by the credit account provider to search for prescreen information about the user, prescreen the user, and if the user passes the prescreen provide at least a partially pre-filled credit application to the user's mobile device.

For example, as shown in FIG. 4A, at 415 the user receives a response that includes a URL. When the user clicks on the link, the user will be presented with a screen 432 that includes the found information being presented to the user. The user can confirm that the information is correct, and that information will then be used to prepopulate the forms at page 435 as described herein.

In one embodiment, the at least partially pre-filled credit application will be sent as a text message (or email or another electronic format) to the user's mobile device 110.

In one embodiment, the partially pre-filled credit application will be available via a mobile app and a link to the mobile app will be sent to the user's mobile device. In one embodiment, the link will be sent as a text message (or email or another electronic format).

In one embodiment, the partially pre-filled credit application will be available via a web access, and a link to the web address will be sent to the user's mobile device. In one embodiment, the link will be sent as a text message (or email or other electronic format), pushed to an application on the mobile device.

In one embodiment, when the user accesses the partially pre-filled credit application, the user will need to verify some or all of the information that has been pre-filled.

In another embodiment, 310 and 315 of FIG. 3A may be performed in a single step, such as shown in FIG. 4B. For example, at 460 of FIG. 4B, the offer asks 461 the user to send her zip code 462 as the initial response to receive the incentive. In so doing, when the user sends the zip code 462, both the user ID 218 (e.g., zip code) and the device ID 216, will be received. That is, in a single response from the user accepting the incentive offer. Although the zip code is shown as request 461, it should be appreciated that one or more of the other user ID 218 discussed herein could be used in the request. The use of zip code is merely one example.

For example, in one embodiment, the user ID 218 that is requested is based upon an evaluation of which of the possible user ID's would provide the best capability for fraud prevention. For example, a user's birthday could be easily obtained (e.g., via social media, public records, etc.) so it would be a lower user ID option on a fraud scale. Similarly, a user's address could be easily obtained (e.g., via social media, public records, etc.) so it would also be a lower user ID option on a fraud scale. Further, a user's email could be easily obtained (e.g., via social media, public records, etc.) or easily guessed, so it would also be a lower user ID option on a fraud scale. In contrast, a social security number (or last four, six, seven, five, middle three, five, first 6, 7; middle three+last two; or any other amount or combination of the nine social security numbers) is much less likely to be obtained fraudulently (e.g., via social media, public records, guessed, etc.) so it may be that a pre-selected portion of the SSN (or a changing selected portion of the SSN) would be the user ID with the highest fraud prevention value.

Customer Information Acquisition

Figure 3B:
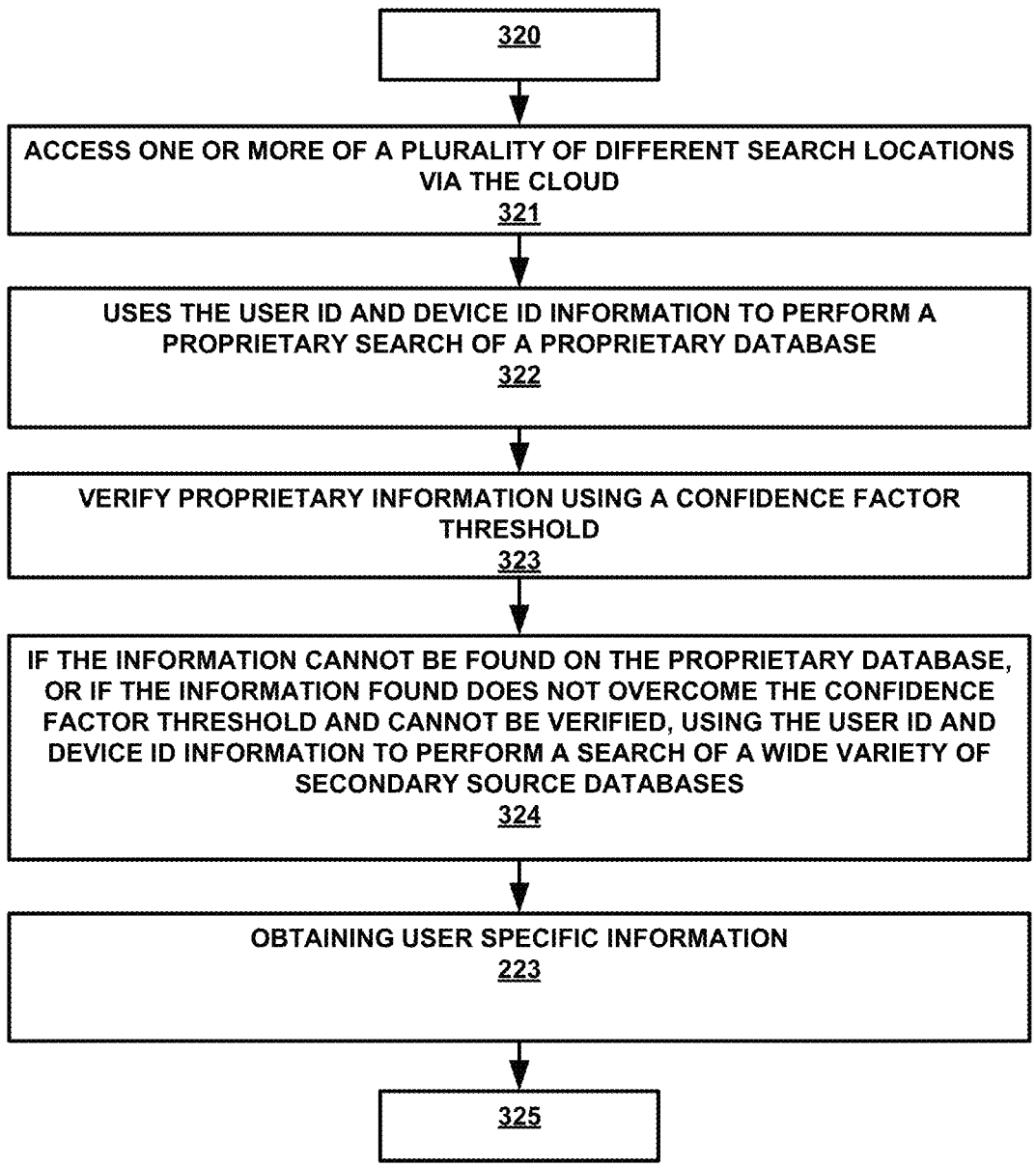
FIG. 3B is a flow chart of a method for utilizing the device identifier and the user identifier to obtain user specific information, in accordance with an embodiment.

With reference now to 320 of FIG. 3A and as shown and expanded in the flowchart 350 of FIG. 3B, e.g., a method for utilizing the device identifier and the user identifier to obtain user specific information 223, one embodiment utilizes device ID 216 and user ID 218 to obtain user specific information 223 useable for a credit screen and/or to pre-populate an electronic form such as a credit application. In general, user specific information 223 could be one or more of: a name and full or partial address, a driver's license number, a social security number, or the like.

As shown at 321 of FIG. 3B, user specific information engine 220 may access one or more of a plurality of different search locations via the cloud 226. An example of cloud 226 is a network such as the Internet, local area network (LAN), wide area network (WAN), or the like.

As described at 322 of FIG. 3B, one embodiment uses the device ID 216 and user ID 218 information to perform a proprietary search 5 of a proprietary database 16. In general, the proprietary database 16 may be one or more databases that store a company's private database such as an Alliance Data Legacy database or the like. Proprietary database 16 will include user specific information 223 for customers that have existing accounts with the company, have previously applied for an account, or the like.

With reference now to 323 of FIG. 3B, in one embodiment, user specific information 223 that is found in the proprietary database 16 will be verified using a confidence factor threshold. For example, a confidence factor determination will be made by looking at the returned records to determine a confidence value. For example, if only one record is found and it is 5 days old, the confidence in the found records would likely be below the confidence value threshold. In contrast, if 2 years of records are found, such as prior accounts, present accounts, memberships, rewards information, and the like, then the confidence value in the user specific information 223 found in the records would be above the confidence factor threshold. If the user specific information 223 does pass the confidence threshold, then the user specific information 223 is returned via return information 12 to user specific info engine 220 and then passed on to credit account builder 230 as discussed and shown in FIG. 2B.

With reference now to 324 of FIG. 3B, if the user specific information 223 cannot be found on the proprietary database, or if the user specific information 223 found does not overcome the confidence factor threshold, one embodiment uses the user ID 218 and device ID 216 information to perform a search of a secondary source database 26. Examples of secondary source databases include Internet engines such as Google, Equifax, Experian, Yahoo, and the like. In one embodiment, the user specific information 223 may be obtained by performing an internet search with the user ID 218 and the device ID 216. For example, the search may include social media sites, search engines, online public records, and the like.

As shown at 223 of FIG. 3B, in one embodiment the user specific information 223 is provided via return information 12 to user specific info engine 220 and then passed on to credit account builder 230 as discussed herein and shown in FIG. 1A.

In one embodiment, if no user specific information 223 is found by secondary source engine 28, or if the user specific information 223 found does not reach the threshold of the confidence factor, the user specific info engine 220 will receive a return empty 39.

With reference now to 325 of FIG. 3A, one embodiment utilizes user specific information 223 to perform a credit screening. In one embodiment, the credit screening is performed based on information obtained from a credit reporting agency. However, in another embodiment, the credit screening will be based on other aspects, such as, but not limited to, the user's mobile carrier account history, the user's home ownership and the like. For example, if a user is identified as being a homeowner, the offer of credit can be made without the need for a credit screening being performed by a credit reporting agency.

In one embodiment, as shown in FIG. 4A, if the offer is to open a credit account then the user will be presented with a screen 432 that includes the found information being presented to the user. The user can confirm that the information is correct, and that information will then be used to prepopulate the forms at page 435 as described herein.

In one embodiment as shown in FIG. 4B, capturable code 405 is for a credit account. As such, the user may initially text for the credit account offer. Thus, looking at FIG. 4B, after the user texted the user ID 218 and/or the device ID 216 as shown in 460, the credit screening would occur. If the credit screening is successful, the flow would go to 435 where the user would be able to complete the application process.

With reference now to FIG. 4C the flow of 435 is shown in additional detail. In one embodiment, after the user applies for the credit offer, the user is directed to a credit application acceptance page(s). In one embodiment, credit application information is pre-filled with the information previously obtained as shown at screen shots 437-439.

In general, screen shot 437 is pre-filled with the information obtained by user specific info engine 220. That is, the information such as name, address, city, state, phone number, email and the like, would be prefilled. Thus, instead of having to type in the information, the user would simply verify that the information is correct and make any changes accordingly. Similarly, if some of the information was missing, the user would be able to fill in only the missing portions without having to complete the entire form. Thus, the user would see a significant reduction in the number of keystrokes for the pre-filled forms which would increase throughput, decrease frustration and the time needed to fill out the forms.

Once verified, the user would go to next screen shot 438 where additional application information would be needed. In screen shot 438, the information includes last 4 of SSN, date of birth, and income. However, it should be appreciated that the information on either of screen shot 437, 438 or 439 may be different, and include less, additional, or other information.

Once the user had completed filling out the information on screen shot 438 (some of which may also be auto-filled depending upon the information requested), the user would hit the next button and then be provided with the terms and conditions as shown in screen shot 439. In one embodiment, the terms and conditions would include a signature portion. Once the user signed and submitted the terms and conditions screen shot 439, the user would then be presented with the new account information as described in 440.

With reference now to 330 of FIG. 3A, once the user passes the credit screening, one embodiment provides a credit application to the user via the user's mobile device.

Figure 3C:
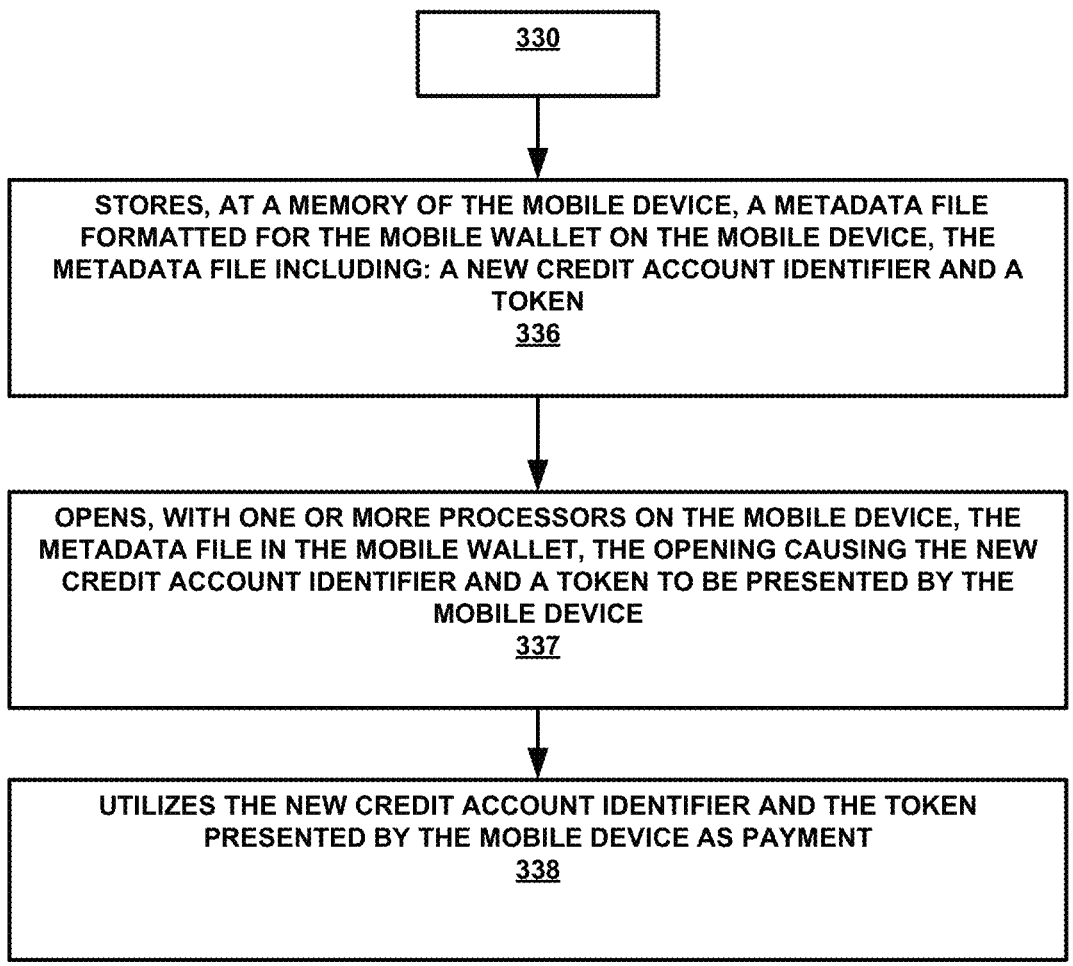
FIG. 3C is a flow diagram of a method for utilizing the new account in the mobile wallet of a mobile device, to make a transaction, in accordance with an embodiment.

FIG. 3C is a flow diagram 375 of a method for utilizing a new credit account 130 in mobile wallet 129 of a mobile device, to make a transaction, in accordance with an embodiment.

Referring now to 336 of FIG. 3C, one embodiment stores, at a memory of the mobile device, a metadata file formatted for the mobile wallet 129 on the mobile device 110. The metadata file 270 including the new credit account 130 and a token.

With reference now to 337 of FIG. 3C, one embodiment opens, with one or more processors on the mobile device 110, the metadata file in mobile wallet 129, the opening causing new credit account 130 to be presented by the mobile device 110. For example, after the metadata file 270 is added to the customer's mobile wallet 129, new credit account 130 would be accessible in the mobile wallet in the same way that any other items are accessed by mobile wallet 129. In one embodiment, the metadata file 270 could also include information that would make sure that the new credit account 130 opens on the top of the mobile wallet stack. For example, when the customer opened the mobile wallet application, new credit account 130 would be the first in the stack that could include other payment cards, tickets, etc.

Figure 5:
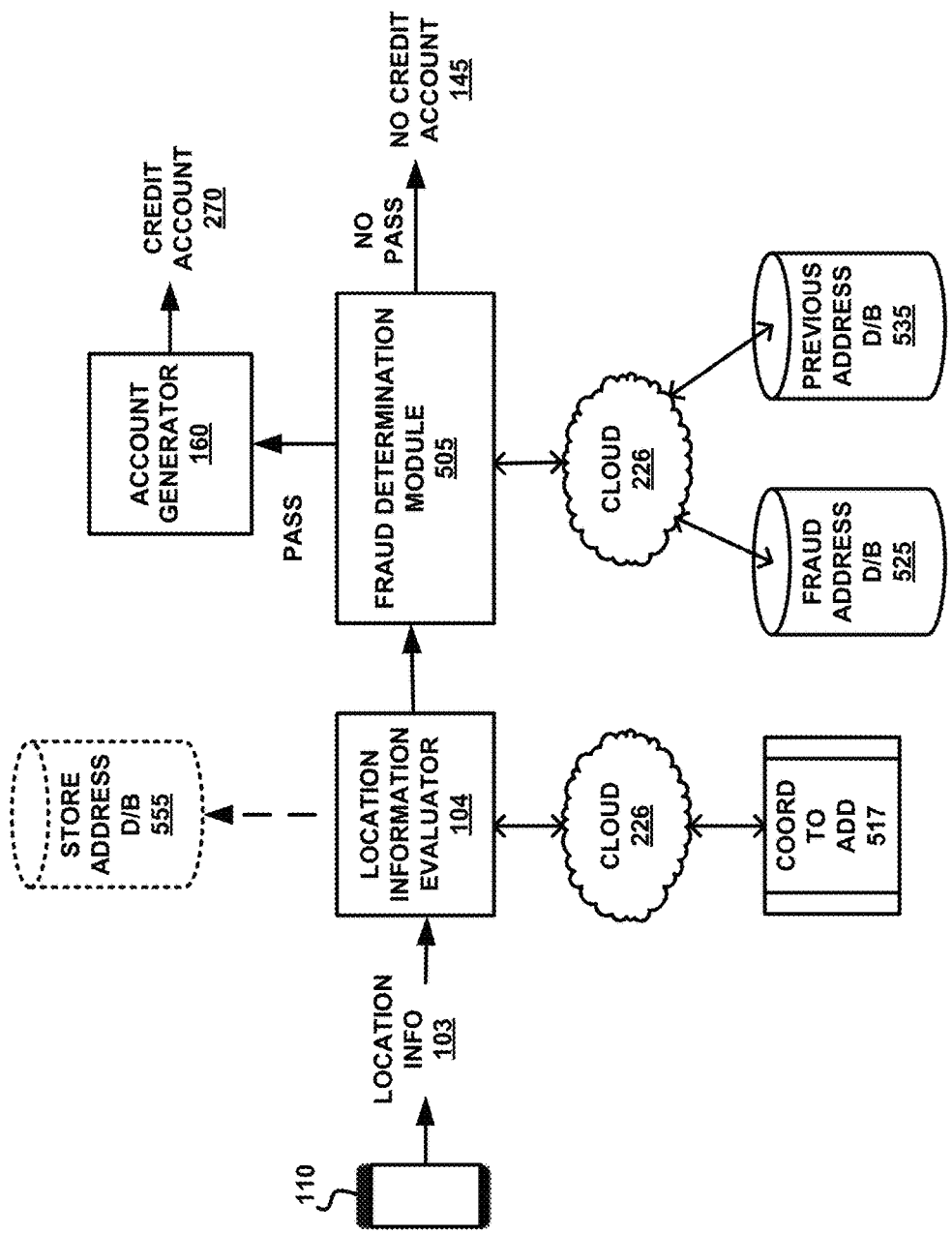
FIG. 5 is a block diagram of an example fraud detection system, in accordance with an embodiment.

With reference now to 338 of FIG. 3C and to FIG. 5, one embodiment utilizes the new credit account and (in one embodiment, the token) presented by the mobile device as payment at a point-of-purchase, POS, associates mobile checkout device, etc.

For example, when the customer goes to a shop and during checkout intends to use a credit account linked to new credit account 130, the customer would present new credit account 130 to the POS (or another checkout system such as an associate's mobile device, etc.) When new credit account 130 is presented at checkout it could include the transmission of the token via a near field communication (NFC), a scan of the new credit account 130 image, a scanning of a digital credit account identifier 444 provided with new credit account 130, etc. In general, since the new credit account 130 has already been validated the token would be provided in conjunction with the information. The token, metadata, barcode, and/or the like would be provided from the POS to the credit account provider which would validate the token and link the purchase to the appropriate customer credit account. The credit account provider would then provide the authorization for the purchase to the POS and the transaction would be completed.

In one embodiment, the transaction could also include information from the device such as user biometric information, location information (e.g., provided by a GPS), the transaction time, the transaction date, etc. In one embodiment, the location information provided by the mobile device will include time and date stamp information. In another embodiment, the location, time and/or date could be obtained from the POS, a combination of the customer's mobile device and the POS, etc.

For example, in one embodiment, the capturable code 405 will include instruction that will cause location information to be included with the text message. In one embodiment, the location information can be used for attribution purposes. For example, if the capturable code 405 was performed at a store location, that location would be identified, and the store would receive attribution.

In one embodiment, the capturable code 405 could be different for stores, for different direct mail customers, etc. For example, instead of (or in addition to) obtaining location information, the scanning of the capturable code 405 at a given store location would cause a store identifier to be added to the text message. The addition of the store identifier could be visually accessible such that the information being sent was clearly shown to the user or it could be included in the metadata with the text message.

Similarly, instead of (or in addition to) obtaining location information, the scanning of the capturable code 405 of a piece of direct mail (or an email, etc.) would cause the address to which the direct mail was sent to be added to the text message. Again, the addition of the address could be visually accessible such that the information being sent was clearly shown to the user or it could be included in the metadata with the text message.

In one embodiment, the location information from the capturable code 405 and the location information from the user's mobile device would both be incorporated into the text message. In one embodiment, the two pieces of location information could be compared as part of the fraud detection/prevention discussed herein. Again, the addition of the location information could be visually accessible such that the information being sent was clearly shown to the user or it could be included in the metadata with the text message.

In one embodiment, the user would be informed of all of the information that was included in the text. In one embodiment, the text message and any data it includes would need to be disclosed to the user and approved by the user before it is allowed to be sent.

In one embodiment, for the transaction to occur, new credit account 130 would be validated using the internet connection from the POS, the biometric information for the customer (as provided via a token or the like) from the customer's mobile device, the location obtained from the mobile device, the time, the date of the transaction initiation, the mobile device identification number, etc.

In so doing, the security of the customer's new credit account 130 payment system would be seamless and nearly instantaneous to the customer and the associate ringing up the transaction, but would include a plurality of checks and balances performed by the credit account provider, the brand, or a fraud determining evaluator assigned to make fraud mitigation determinations and/or evaluations.

With reference now to 440 of FIGS. 4A-4C, one embodiment provides the new credit account 130 to the mobile wallet 129 on the user's mobile device 110. In one embodiment, new credit account 130 is instantly available to be used as a form of payment. In one embodiment, new credit account 130, will include a digital credit account identifier 444 that can be presented on display 112 of mobile device 110. For example, digital credit account identifier 444 could be a QR code, bar code, digital image of a credit card, or other type of identifier for providing credit account information digitally to a POS.

One example of a digital credit account identifier 444 may include: the user's name, credit limit, store card account number, terms of use 446, a rotating GIF to prevent screenshots from being accepted at POS, a banner asking customer to present their ID to the associate to use the new credit account, or the like.

Fraud Detection

With reference now to FIG. 5, a block diagram of a system for fraud detection is described in accordance with an embodiment. In general, system 500 includes a fraud determination module 505 which receives address information from the location information evaluator 104 which determines the address from the raw location information 103 provided by mobile device 110. System 500 also includes cloud 226 which may be any type or wired or wireless network connection including private, public, Local, Wide, Internet, and the like.

In one embodiment, fraud determination module 505 is a rules based fraud determination engine, that can change the weighting of risk factors, etc. For example, the user ID and/or the device ID information that is obtained can be used to evaluate for fraud. For example, the user ID that is provided to the application process is ranked or evaluated for its fraud potential. For example, 1 is the lowest fraud risk and 10 is the highest. If the user's zip code is provided it may be ranked at a 7 out of 10 for fraud. In contrast, if the last 6 of the user's SSN is provided it may be ranked at a 2 out of 10 for fraud.

Similarly, the device ID that is provided to the application process is ranked or evaluated for its fraud potential. For example, 1 is the lowest fraud risk and 10 is the highest. If the mobile number is provided it may be ranked at a 5 out of 10 for fraud.

The fraud risk is then evaluated. The evaluation could be for one of the identifiers, both of the identifiers, or a combination of the identifiers. For example, in one embodiment when the fraud scale is base 10, the single identifier fraud risk would be evaluated as low if it is a 3 or below, medium if it is between 4-5, high if it is between 6-8, and unacceptable if it is 9 or above.

If both of the fraud rankings are added together the scale could remain the same or could be different. For example, the scale could remain the same, be doubled, have the range changed such that 15 (or whatever value is selected) is the new top range, etc. For example, the fraud risk for the combined value (using a top range of 15) would be evaluated as low if it is a 4 or below, medium if it is between 5-8, high if it is between 9-11, and unacceptable if it is 12 or above.

In another embodiment, the scale could be out of any number, e.g., 20, 50, 100, etc. depending upon the desired granularity. In one embodiment, there could be an additional level of granularity if the resultant fraud risk was at a certain level (e.g., a 6 could cause additional evaluation to determine a finer granularity of 6.3 or 6.6).

In one embodiment the result of the fraud risk determination controls at least one aspect of the new credit account. For example, if the fraud risk determination result is low, the fraud determination does not interfere with the amount of credit available on the new credit account.

In contrast, when the result of the fraud risk determination is medium, the amount of credit available on the new credit account may be reduced (for example the user would qualify for a credit limit A, the credit limit would be reduced by fraud risk amount (or percentage, or the like) B, resulting in an initial credit limit of A-B (or A reduced by B %, or the like). Similarly, when the result of the fraud risk determination is high, the amount of credit available on the new credit account is again reduced based on the fraud risk. In one embodiment, the reduction of the credit limit is only for a probationary time period, such as until the fraud risk is deemed to be lower.

In one embodiment, if the fraud risk determination is unacceptable, the application process will deny the customer from receiving the new credit account. In one embodiment, if the fraud risk determination is unacceptable the application process will deny the customer from continuing the application process for the new credit account. In one embodiment, if the fraud risk determination is unacceptable, the application process will not provide any automatic pre-filling of the application and flag the application for the new credit account.

Consider the following example for purpose of clarity. In the following examples, the scale for a single risk factor is 10 and the combination of risk factors is 15.

A. The user's zip code is provided and is ranked at a 9, e.g., an unacceptable fraud risk.

B. The last 4 of the user's SSN is provided and is ranked at a 2, e.g., a low fraud risk.

C. The mobile number is provided and is ranked at a 5, e.g., a medium fraud risk.

D. The mobile device UUID is provided and is ranked at a 2, e.g., a low fraud risk.

Example 1

If user ID 'A' (risk level 9) and device ID 'C' (risk level 5) were provided, the fraud determination would be an unacceptable user ID fraud risk, and a medium device ID fraud risk. If the fraud determination was based on the highest single fraud determination, then the fraud determination would result in an unacceptable fraud risk. In one embodiment, this would stop the application process and the user would be denied.

Example 2A

If user ID 'A' (risk level 9) and device ID 'C' (risk level 5) were provided, the fraud determination would be an unacceptable user ID fraud risk, and a medium device ID fraud risk. In one embodiment, the application could request a second user ID 'B' (risk level 2). After the user provided information user ID 'B', in one embodiment, the user ID fraud risk would become a risk level 2. If the fraud determination was based on the highest single fraud determination, then the fraud determination would result in medium fraud risk (risk level 5). In one embodiment, this would allow the application process to be completed but the user would receive a credit account that may or may not have a reduced credit limit (e.g., 1,000 dollar limit, etc.).

Example 2B

In one embodiment, the user ID and/or device ID is used during a look-up process for identifying the user and obtaining user information. The user information would be the information necessary for completing the application and/or the prequalification process. In one embodiment, user ID 'A' would be compared with the additional user information. If user ID 'A' (risk level 9) correlates with the user information, this could cause a further risk level reduction from the risk level 5 in example 2A to the low fraud risk level 4. In so doing, the user would not receive a reduced initial credit limit.

Example 3

If user ID 'A' (risk level 9) and device ID 'C' (risk level 5) were provided, the fraud determination would be an unacceptable user ID fraud risk, and a medium device ID fraud risk. If the fraud determination was based an amalgamation of two or more of the fraud components, then (in one non-weighted embodiment) the fraud determination would result in a risk level 14 which would result in an unacceptable fraud risk. In one embodiment, this would stop the application process and the user would be denied.

Example 4A

If user ID 'A' (risk level 9) and device ID 'C' (risk level 5) were provided, the fraud determination would be an unacceptable user ID fraud risk, and a medium device ID fraud risk. In one embodiment, the application could request a second device ID 'D' (risk level 2). After the user provided information D, in one embodiment, the device ID fraud risk would become a risk level 2. If the fraud determination was based on an amalgamation of two or more of the fraud components, then (in one non-weighted embodiment) the fraud determination would result in a risk level 11 which would be a high fraud risk. In one embodiment, this would allow the application process to be completed but the user would receive a credit account with a reduced credit limit (e.g., 500 dollar limit, etc.).

Example 4B

In one embodiment, the user ID and/or device ID is used during a look-up process for identifying the user and obtaining user information. The user information would be the information necessary for completing the application and/or the prequalification process. In one embodiment, device ID 'C' would be compared with the additional user information. If device ID 'C' (risk level 5) correlates with the obtained user information, this could cause a further risk level reduction from the high fraud risk level 11 in example 4A to the medium fraud risk level 8. In one embodiment, this would allow the application process to be completed but the user would receive a credit account that may or may not have a reduced credit limit (e.g., 1,000 dollar limit, etc.).

Example X

If user ID 'A' (risk level 9) and device ID 'C' (risk level 5) were provided, the fraud determination would be an unacceptable user ID fraud risk, and a medium device ID fraud risk. In one embodiment, the application could request a second user ID 'B' (risk level 2). After the user provided information user ID 'B', in one embodiment, the user ID fraud risk would become a risk level 2. In one embodiment, the application could request a second device ID 'D' (risk level 2). After the user provided information D, in one embodiment, the device ID fraud risk would become a risk level 2.

If the fraud determination was based on the highest single fraud determination, then the fraud determination would result in low fraud risk (risk level 2).

If the fraud determination was based on an amalgamation of two or more of the fraud components, then (in one non-weighted embodiment) the fraud determination would result in a risk level 4 which would also be a low fraud risk.

Further, the user ID and/or device ID is used during a look-up process for identifying the user and obtaining user information. In one embodiment, user ID 'A' and device ID 'C' would be compared with the obtained user information. If user ID 'A' and device ID 'C' correlate with the obtained user information, this would provide a further fraud risk level reduction. In contrast, if one or both of user ID 'A' and device ID 'C' did not correlate with the obtained user information, this could result in an increase in the fraud risk level. In one embodiment, the increase could be to a next higher level. In one embodiment, the user may be asked about the lack of correlation.

In one embodiment, if one or both of user ID 'A' and device ID 'C' did not correlate with the obtained user information, the non-correlated information could be manually or automatically evaluated to determine if the lack of correlation is due to a clerical, typographical, or accidental error. For example, if user ID 'A' did not correlate, it would be evaluated. If the user input user ID 'A' was zip code 12555 and the obtained user information is zip code 12255, it may be evaluated as a user input error and no fraud risk escalation would be made. In contrast, if the user input user ID 'A' was zip code 96896 and the obtained user information is zip code 12255, it would be evaluated as a deceitful input and the fraud risk escalation would be made or additional fraud risk evaluations would occur.

Thus, the fraud determination could be set as the highest fraud ranking of the highest fraud component, it could be set as an amalgamation of two or more of the fraud components, it could be adjusted based on the following additional fraud determination factors, it could be set as a weighted value for one of the user ID versus the Device ID, e.g., the user ID ranking carries 20% weight and the device ID carries an 80% weight, etc. Of course, the weighting could be ID dependent, set to different values, or the like.

In addition to the device ID and user ID fraud determination discussed above, there could be additional fraud determination factors that are described below and can be used to modify the fraud risk determination.

Additional Fraud Determination Factors

After the user is identified and the user information is obtained, the user information will be evaluated to determine if the user's information in the account center has had recent changes to home address, email, device number, etc. If a recent change has occurred, then additional fraud evaluation will occur.

For example, a static IP address correlated with a particular MAC address would have a low fraud risk. In contrast, a MAC address that changes with respect to a static IP address would have a higher fraud risk. In one embodiment, if the static IP address includes a certain number of different MAC addresses (e.g., more than 2, 5, 10, 20, etc.) then the fraud risk would be weighted based on the number of different MAC addresses received from the static IP address.

Known Fraudulent Address

In one embodiment, the location where the applicant completed the application is determined by location information evaluator 104 from the location information 103 provided by the mobile device 110. The location information evaluator 104 would evaluate the real-time location information 103 and cross-reference the real-time location information 103 with the one or more different coordinate-to-address determination sources 517, to generate a likely address. Similar to above, if the accuracy of the location information is high enough, a complete address for where the applicant completed the application will be obtained. If the accuracy of the location information is not high enough, then a general area for where the applicant completed the application will be obtained.

In one embodiment, fraud determination module 505 will access a database 525 of known fraudulent addresses and compare the location where the application was completed with the known fraudulent addresses found in the database. Fraud determination module 505 will determine, based on the location comparison, whether the location where the application was completed is found in the database 525 of known fraudulent addresses. If the location where the application 193 was completed is found in the database 525 of known fraudulent addresses, the credit application will be denied and no credit account 545 will be established. In contrast, if the location where the application 193 was completed is not found in the database 525 of known fraudulent addresses, the credit application will pass the fraud determination and the application will be passed to account generator 160 which will evaluate the application 193 and may issue a credit account 270.

If the location where the application 193 was completed cannot be defined specifically enough to ensure that it is not a match for, or not found in, the addresses of database 525 of known fraudulent addresses, then the fraud determination module 505 will be able to make a number of choices. For example, if the general location where the application 193 was completed is in an area that includes a threshold number (e.g., 4 within the same block, etc.) of known fraudulent addresses, fraud determination module 505 will deny the credit application and no credit account 545 will be established. In contrast, if the general location where the application 193 was completed is in an area that includes no known fraudulent addresses, fraud determination module 505 may pass the credit application to account generator 160 with a small fraud determination resulting in a suggestion that the initial credit amount be lowered accordingly. However, if the general location where the application 193 was completed is in an area that includes less than a threshold number (e.g., 2 within the same block, etc.) of known fraudulent addresses, fraud determination module 505 may pass the credit application to account generator 160 with a medium fraud determination resulting in a suggestion that the initial credit amount be lowered significantly.

In one embodiment, lowering an applicant's credit limit accordingly may mean a reduction of 10-20% from what would have been the initial credit amount while lowered significantly would mean a reduction of 50-75% in the initial credit amount. However, it should be appreciated that these percentages are one example. The risk aversion of the credit account provider may cause an increase or decrease in the percentages and even turn the medium risk applications into rejections such that no credit account 545 is established.

Previously Used Addresses

In one embodiment, fraud determination module 505 will access a database 535 of previously used addresses and compare the location where the application was completed with the previously used addresses found in the database. Fraud determination module 505 will determine, based on the comparing, whether the location where the application was completed is found in the database 535 of previously used addresses.

If the location where the application 193 was completed is not found in the database 535 of previously used addresses the credit application will pass the fraud determination and the application will be passed to account generator 160 which will evaluate the application 193 and issue a credit account 270.

However, if the location where the application 193 was completed is found in the database 535 of previously used addresses, fraud determination module will determine a type of residence at the location where the application was completed. In one embodiment, the type of residence may be found in the database 535 of previously used addresses. In another embodiment, fraud determination module 505 will receive additional information about the location from the one or more different coordinate-to-address determination sources 517 via location information evaluator 104. The additional information will be used to determine the type of residency.

Fraud determination module 505 will then make a risk assessment based on the result of the determination regarding the type of residence.

For example, if the location where the application 193 was completed is found in the database 535 of previously used addresses and it is determined that the type of residence at that address is a single family home, then the fraud determination module 505 will be able to make a number of choices. If the number of applications received from the previously used address exceeds a threshold number (e.g., 3 within the same single family home) fraud determination module 505 will deny the credit application and no credit account 545 will be established.

In contrast, if the number of applications received from the previously used address is less than a threshold number (e.g., 2 within the same single family home) fraud determination module 505 may pass the credit application to account generator 160 with a low fraud determination resulting in a suggestion that the initial credit amount be lowered accordingly.

Similarly, if the location where the application 193 was completed is found in the database 535 of previously used addresses and it is determined that the type of residence at that address is a multi-family home (e.g., condo, townhome, apartment building, etc.), then the fraud determination module 505 will determine the number of dwellings within the multi-family home. If the number of applications received from the previously used address exceeds a threshold number (e.g., 80% of the dwellings within the multi-family home) fraud determination module 505 will pass the credit application to account generator 160 with an intermediate fraud determination resulting in a suggestion that the initial credit amount be lowered accordingly.

In contrast, if the number of applications received from the previously used address is less than a threshold number (e.g., 80% of the dwellings within the multi-family home) fraud determination module 505 will pass the credit application to account generator 160 with a low fraud determination resulting in a suggestion that the initial credit amount be lowered accordingly.

In one embodiment, if the location where the application 193 was completed cannot be defined specifically enough to ensure that it is not a match for, or not found in, the addresses of database 535 of previously used addresses, then the fraud determination module 505 would report that lack of fraud determination to account generator 160. In another embodiment, if the location where the application 193 was completed cannot be defined specifically enough to ensure that it is not a match for, or not found in, the addresses of database 535 of previously used addresses, then the fraud determination module 505 would deny the application and no credit account 545 would be established.

However, it should be appreciated that these solutions to the problem that occurs when the location where the application 193 was completed cannot be defined specifically enough may be defined differently based on the risk aversion of the credit account provider. For example, the credit account provider may provide specific guidance such as an increase or decrease in the percentages, turn the medium risk applications into rejections such that no credit account 545 is established, or turn the rejections into some level of risk such that a credit account 270 is opened.

Store Attribution

In one embodiment, as described previously, the location where the applicant completed the application is determined by location information evaluator 104 from the location information 103 provided by the mobile device 110. The location information evaluator 104 would evaluate the real-time location information 103 and cross-reference the real-time location information 103 with the one or more different coordinate-to-address determination sources 517, to generate a likely address. Similar to above, if the accuracy of the location information is high enough, a complete address for where the applicant completed the application will be obtained. If the accuracy of the location information is not high enough, then a general area for where the applicant completed the application will be obtained.

In one embodiment, location information evaluator 104 will access a database 555 of retail location addresses and compare the location where the application was completed with the retail location addresses found in the database. Location information evaluator 104 will determine, based on the location comparison, whether the location where the application was completed is found in matches a retail location address. If the location where the application 193 was completed does match a retail location address, location information evaluator 104 will automatically provide store attribution to the retail store associated with the retail location address.

Location Information for Fraud

Figure 6:
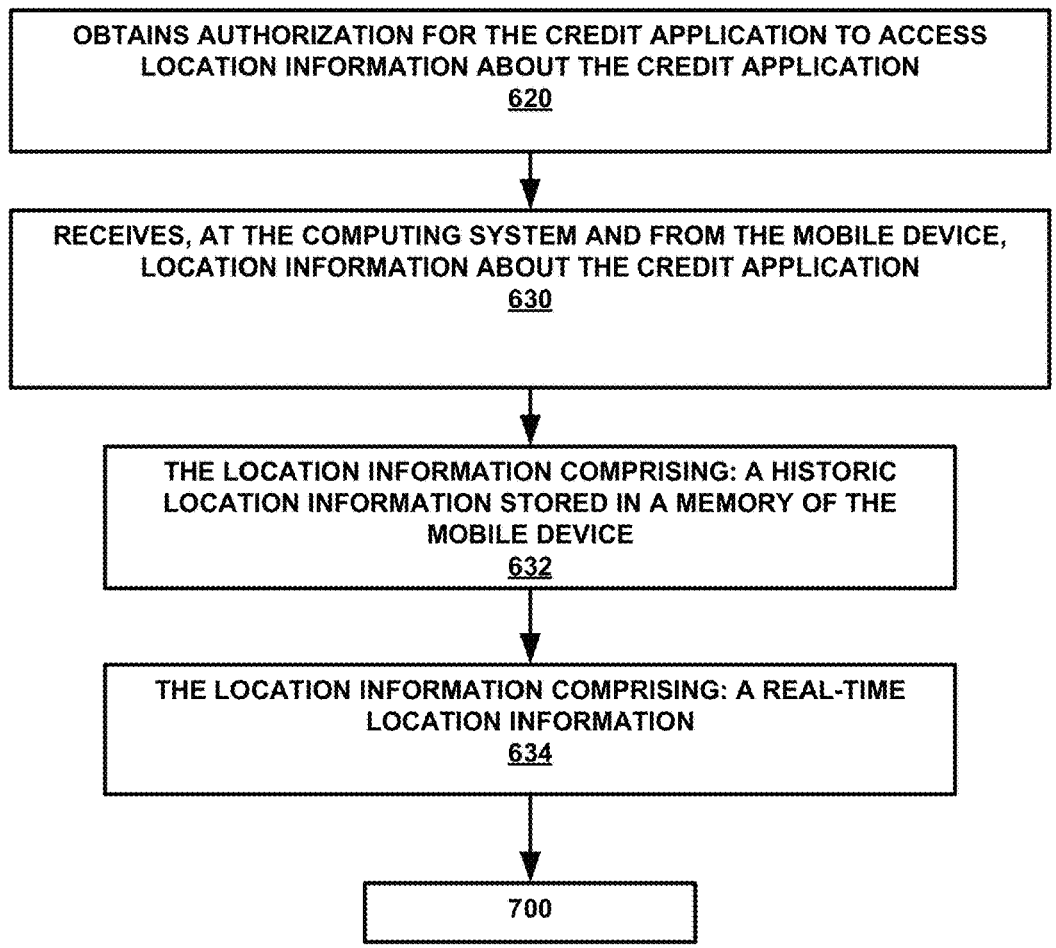
FIG. 6 is a flowchart of a method for using position location information to pre-populate information on a credit application, in accordance with an embodiment.

With reference now to FIG. 6, a flowchart 600 of a method for using position location information to fraud check a credit application is shown in accordance with an embodiment.

With reference now to 620 of FIG. 6, one embodiment obtains authorization for the application 193 to access location information 103 about the credit application.

With reference now to 630 of FIG. 6, one embodiment receives, at the computer system location information 103 about the credit application. In one embodiment, the location information 103 generated by a positioning system tracking such as GPS 218 on the mobile device 110. In one embodiment, the positioning system is on the mobile device, and is one or more of, but is not limited to, GPS, WiFi, cellular service, beacon derived location determination, NFC ranges, Bluetooth range, and the like. In another embodiment, the positioning system is virtual, which means that the positioning system is not on the mobile device 110 but is an interface, such as a GPS chip interface, that functions with software or web applications allowing the location functionality to work outside of a traditionally defined mobile device 110 or credit application.

Because of the different positioning systems available on a mobile device, the location information 103 provided by one or more positioning systems on the mobile device 110 can include differing levels of accuracy. For example, a GPS enabled mobile device 110 can provide location information 103 that is accurate to within a few meters or less. In contrast, location information 103 derived from cellular service, beacon or WiFi location capabilities of mobile device 110 can provide a location radius or location area that may be within 10-50 meters or even larger. For example, the mobile device 110 being located within range of a beacon at ninth street, a Wi-Fi hot-spot at a given coffee shop, within range or a single cellular service tower, within an overlapping area of a number of cellular service towers, a combination of the above, and the like.

In one embodiment, included with the location information 103 would be a level of accuracy. For example, location information 103 may be identified as having a high level of accuracy (0-5 meters), a medium level of accuracy (6-20 meters), a low level of accuracy (>20 meters), or the like. Although a number of different accuracies are discussed, it should be appreciated that there may be more or fewer levels of accuracy associated with location information 103. Further, the ranges of the different levels of accuracy disclosed may also be different based on preference, guidelines, needs, and the like.

Additionally, location information 103 may be determined by the positioning system at constant intervals, at pre-assigned time periods, when location determination commands are received, based on the use of the mobile device 110, an application on the mobile device 110, when a change is noted by the positioning system, and the like.

Further, location information 103 may be recorded in the memory of the mobile device every time a location determination is made by the positioning system, at constant intervals, at pre-assigned time periods, when location storage commands are received, when a change is noted in the location information 103, and the like. Likewise, the level of accuracy may be determined each time location information 103 is generated by the positioning system, only when the level of accuracy has changed, at certain intervals of location information 103 generation, or the like.

At 632, location information 103 includes historic location information stored in a memory of the mobile device. Historic location information refers to location information 103 that is not real-time location information. Historic location information will include a date/time stamp. The historic location information would allow the stored location information to be searched, sorted, and evaluated. In one embodiment, the historic location information includes all location information 103 stored on the memory of the mobile device 110. Historic location information may cover the entire period the applicant has owned the mobile device. In another embodiment, the time range for the historic location information is limited. For example, the location data may only be obtained for a pre-defined time range, e.g., the past 2 years, 1 year, 6 months, 3 months, 3 weeks, 5 days, etc. Although a number of time ranges are provided, it should be understood that the time range may be user definable, application pre-defined, established by the credit provider, established by law or statute, state or country dependent, or the like.

At 634, location information 103 includes real-time location information obtained from the positioning system. Real-time location information would be location information 103 that is generated in real time by the positioning system. The real-time location information would be constantly replaced as location information 103 generated by the positioning system received at the computer system, e.g., location information evaluator 104.

In one embodiment, location information 103 provided by mobile device 110 is coordinate data. Therefore, to determine an address, the coordinate data is cross-referenced with one or more different coordinate-to-address determination sources such as: mapping software, surveyor data that includes business and/or residential information, County assessor's information, or other coordinate-to-address determiners.

Included with location information 103 would be the level of accuracy of the location information. As such, when the location information coordinate data is cross-referenced with the one or more different coordinate-to-address determination sources, the resulting address may be specific or may be a general ballpark area.

The high level of accuracy indication about the coordinate data would likely allow a specific address to be determined when location information 103 is cross-referenced with the one or more different coordinate-to-address determination sources.

The medium level of accuracy indication about the coordinate data may allow a specific address to be determined when location information 103 is cross-referenced with the one or more different coordinate-to-address determination sources, or may result in a general address area. The determination would be based on the actual level of accuracy, the density of businesses and residences within the radius of the location information, and the like. For example, in an area with houses on acre plots, the medium level of accuracy would indicate a specific house. However, in an area with clusters of businesses, such as a strip mall, the medium level of accuracy may only be able to narrow the business address to one of a few different possibilities.

Except for the most rural cases or largest company buildings, the low level of accuracy indication about the coordinate data would not allow a specific address to be determined when location information 103 is cross-referenced with the one or more different coordinate-to-address determination sources. However, even at the low level of accuracy, the number of possible street names for a home or business address would be reduced.

In one embodiment, the applicant's likely home location is determined from location information 103 provided by mobile device 110. The computer system, e.g., location information evaluator 104, would evaluate the historical location information received from the device for a plurality of prior overnight time periods over a plurality of different nights. For example, location information 103 can be organized into time periods, e.g., midnight to 5 am and then reviewed for a prior time period, e.g., weeks, months, etc.

The likely home location is then determined based on the historical location information evaluation. For example, by sorting and then tallying the locations of mobile device 110 during the selected time period (e.g., the past 45 days), it is likely that the location that is found most often is where the applicant resides at night. Thus, it is likely the applicant's home location.

The applicant's likely home location, and the associated accuracy value of location information 103, is then cross-referenced with the one or more different coordinate-to-address determination sources to generate an address. If the accuracy of the likely home location is high enough, a complete address for the applicant's likely home is obtained. The complete address is then prefilled into the home address portion of application 193.

However, if the accuracy of the likely home location is not high enough to obtain a specific address, at least some level of information about the likely home location is obtained and provided to application 193. For example, a prefill capability for the application 193 can be simplified, or a drop down menu populated, by knowing what is local to the likely home location. As such, when the applicant is filling out the street address, the likely home location information is used to limit the number of possible streets that are offered in a drop down menu, a quick fill such as a type completion algorithm, or the like.

For example, if the applicant starts typing with the letter 'M', the limited number of possible streets within the likely home location area will cause application 193 to offer only those M street names. In this example, Maple, Moore, and Murray. After the applicant types 'M', the application will present the applicant with the prefill options of Maple, Moore, and Murray, from which the applicant can select. Alternatively, if the applicant continues by typing a 'u', the prefill will complete Murray as it is the only street within the likely home location containing those starting letters. Similarly, in the drop down menu context, every street name within the likely home location would be provided in the drop down menu and the applicant would select the correct street name from the drop down menu.

Likewise, the applicant's likely work address is determined from location information 103 provided by mobile device 110. The computer system, e.g., location information evaluator 104, would evaluate the historical location information received from the device for a plurality of prior daytime periods over a plurality of different days. For example, the location information 103 can be organized into time periods, e.g., 9 am to 4 pm, and then reviewed for a prior time period, e.g., weeks, months, etc.

A likely work address is then determined based on the historical location information evaluation. For example, by sorting and then tallying the locations where mobile device 110 was located during the selected time period (e.g., the past 30 days), it is likely that the location that is found most often is where the applicant works. Thus, it is likely the location of the applicant's work address.

Similar to above, the applicant's likely work location, and the associated accuracy value of location information 103, is then cross-referenced with the one or more different coordinate-to-address determination sources, to generate an address. If the accuracy of the likely work location is high enough, a complete work address for the applicant is likely obtained. The complete work address is then prefilled into the work address portion of application 193.

As recited above, if the accuracy of the likely work location is not high enough to obtain a specific address, at least some level of information about the likely work location is obtained and provided to application 193. For example, a prefill capability for the application 193 can be simplified, or a drop down menu populated, by knowing what is local to the likely work location. As such, when the applicant is filling out the street address, the likely work location information is used to limit the number of possible streets that are offered in a drop down menu, the quick fill type completion algorithm, or the like.

It should be appreciated that information for a number of different locations can be obtained in the same manner as described above. For example, the historical location information could be used, by the computer system, to determine an amount of time that the applicant has spent at a retail store location. The amount could be the total amount of time, the amount of time over the past month, week, or the like. If the amount of time surpasses an established threshold, the credit account 270 would receive a recommendation for an initial credit limit increase for the applicant.

Thus, the location information can be used to determine one or more of: a full or partial home address, a full or partial work address, a location where the application was completed, locations where the applicant spends a lot of time, locations where the applicant does not go, and the like.

Verification/Risk Assessment/Fraud Detection

With reference now to 710 of FIG. 7, one embodiment compares, at the computer system, e.g., location information evaluator 104, the location information from the positioning system with other location information provided on the credit application 193.

In one embodiment, the other location information provided within the credit application 193 is information provided by the applicant. Additionally, application 193 could include other location information obtained from a driver's license scan or search, from a search utilizing the mobile number provided by the mobile device, from the user specific info engine 220 of FIG. 1B which uses some applicant identification and/or device identification information to perform a search for information. One or more of the sources may provide the resultant information into the application 193.

Verification

For example, location information 103 was used by location information evaluator 104 to determine that the applicant's home address is 123 Market Street. The other sources have also provided a home address of 123 Market Street to be prefilled into application 193. Since the comparing of the location information 103 obtained from mobile device 110 with the information for the credit application obtained from another source matches, a verification of the probable home address is made.

Updating/Replacing

In the updating example, location information evaluator 104 determined that the applicant's home address is likely 123 Market Street. However, information obtained from one or more of the other sources have provided a different home address, e.g., 99 Onion Way to be prefilled into application 193. Since the comparison of the location information 103 obtained from mobile device 110 with the information obtained from another source resulted in a difference between the two possible addresses, the information obtained from the one or more other sources is replaced with the location information 103 during the prefilling of application 193.

In one embodiment, in addition to replacing the location information obtained from the one or more other sources with the location information 103 from mobile device 110 in the application 193, the location information 103 from mobile device 110 can also be provided to the one or more of the other sources that had provided a different address. Such that the one or more other sources, e.g., 220 et al., will contain the updated location information.

Since there are a number of home addresses found, location information evaluator 104 compares the likely home address determined from the downloaded location information 103 with the home address provided on the credit application 193.

Risk Assessment

Referring now to 720 of FIG. 7, one embodiment makes, at the computer system, e.g., fraud determination module 505 of FIG. 5, a risk assessment based on a result of the comparison. The following discussion utilizes the home address for the comparison. However, it should be appreciated that any or all addresses determined to be of interest in the application, e.g., home, work, etc. can be subject to comparison. However, for purposes of clarity, the following example refers to the home address.

For example, when the comparison results in a similar or a matching home address as described in the verification portion, a risk solution from the risk assessment, would likely result in a low concern for fraud, e.g., it is likely that the address in the application 193 is correct.

In contrast, when the comparison results in a dissimilarity, as described in the updating/replacing section, a risk assessment would likely result in a concern of medium or high level fraud. For example, depending upon the source that provided the conflicting location information, the level of fraud risk would likely, but not necessarily, be different. For example, if the information was input by user specific info engine 220, the difference may be due to an incorrect match with the applicant, the applicant having moved, or the like. In that case, the level of fraud risk may be set to medium which would, in one embodiment, result in the applicant receiving a credit account 270 with a reduced initial credit limit.

However, if the incorrect information was input into application 193 by the applicant, the difference is likely due to error or deceit. Thus, a risk assessment would likely result in a concern a higher fraud risk. In one embodiment, due to the higher fraud risk, the applicant would receive a denial of the credit account, e.g., no credit account 545.

Alternatively, prior to denying the credit account, the applicant may receive an additional question about the inconsistency of the home address provided in application 193. If the applicant recognizes the mistake, and corrects the field to include a home address that matches the historical location information determination, then it is probable that the fraud risk level would be lowered to either medium, e.g., the applicant receiving a credit account 270 with an initial credit limit reduction, or a low concern, e.g., the applicant receiving a credit account with no initial credit limit reduction.

Example Computer System Environment

With reference now to FIG. 8, portions of the technology for providing a communication composed of computer-readable and computer-executable instructions that reside, for example, in a non-transitory computer-readable medium for storing instructions of a computer system. That is, FIG. 8 illustrates one example of a type of computer that can be used to implement embodiments of the present technology. FIG. 8 represents a system or components that may be used in conjunction with aspects of the present technology. In one embodiment, some or all of the components described herein may be combined with some or all of the components of FIG. 8 to practice the present technology.

FIG. 8 illustrates an example computer system 800 used in accordance with embodiments of the present technology. It is appreciated that system 800 of FIG. 8 is only an example and that the present technology can operate on or within a number of different computer systems including general purpose networked computer systems, embedded computer systems, routers, switches, server devices, user devices, various intermediate devices/artifacts, stand-alone computer systems, mobile devices, personal data assistants, televisions and the like. As shown in FIG. 8, computer system 800 of FIG. 8 is well adapted to having peripheral computer readable media 1002 such as, for example, an external hard drive, a compact disc, a flash drive, a thumb drive, a wireless radio enabled device, and the like coupled thereto.

Computer system 800 of FIG. 8 includes an address/data/control bus 1004 for communicating information, and a processor 1006A coupled to bus 1004 for processing information and instructions. As depicted in FIG. 8, system 800 is also well suited to a multi-processor environment in which a plurality of processors 1006A, 1006B, and 1006C are present. Conversely, system 800 is also well suited to having a single processor such as, for example, processor 1006A. Processors 1006A, 1006B, and 1006C may be any of various types of microprocessors. Computer system 800 also includes data storage features such as a computer usable volatile memory 1008, e.g., random access memory (RAM), coupled to bus 1004 for storing information and instructions for processors 1006A, 1006B, and 1006C.

System 800 also includes computer usable non-volatile memory 1100, e.g., read only memory (ROM), coupled to bus 1004 for storing static information and instructions for processors 1006A, 1006B, and 1006C. Also present in system 800 is a data storage unit 1102 (e.g., a magnetic disk drive, optical disk drive, solid state drive (SSD), and the like) coupled to bus 1004 for storing information and instructions. Computer system 800 also includes an optional alpha-numeric input device 1104 including alphanumeric and function keys coupled to bus 1004 for communicating information and command selections to processor 1006A or processors 1006A, 1006B, and 1006C. Computer system 800 also includes an optional cursor control device 1106 coupled to bus 1004 for communicating user input information and command selections to processor 1006A or processors 1006A, 1006B, and 1006C. Optional cursor control device may be a touch sensor, gesture recognition device, and the like. Computer system 800 of the present embodiment also includes an optional display device 1108 coupled to bus 1004 for displaying information.

Referring still to FIG. 8, optional display device 1108 of FIG. 8 may be a liquid crystal device, cathode ray tube, OLED, plasma display device or other display device suitable for creating graphic images and alpha-numeric characters recognizable to a user. Optional cursor control device 1106 allows the computer user to dynamically signal the movement of a visible symbol (cursor) on a display screen of display device 1108. Many implementations of cursor control device 1106 are known in the art including a trackball, mouse, touch pad, joystick, non-contact input, gesture recognition, voice commands, bio recognition, and the like. In addition, special keys on alpha-numeric input device 1104 capable of signaling movement of a given direction or manner of displacement. Alternatively, it will be appreciated that a cursor can be directed and/or activated via input from alpha-numeric input device 1104 using special keys and key sequence commands.

Computer system 800 also includes an I/O device 1020 for coupling system 800 with external entities. For example, in one embodiment, I/O device 1020 is a modem for enabling wired or wireless communications between system 800 and an external network such as, but not limited to, the Internet or intranet. A more detailed discussion of the present technology is found below.

Referring still to FIG. 8, various other components are depicted for system 800. Specifically, when present, an operating system 1022, applications 1024, modules 1026, and data 1028 are shown as typically residing in one or some combination of computer usable volatile memory 1008, e.g. random access memory (RAM), and data storage unit 1102. However, it is appreciated that in some embodiments, operating system 1022 may be stored in other locations such as on a network or on a flash drive; and that further, operating system 1022 may be accessed from a remote location via, for example, a coupling to the internet. In one embodiment, the present technology, for example, is stored as an application 1024 or module 1026 in memory locations within RAM 1008 and memory areas within data storage unit 1102. The present technology may be applied to one or more elements of described computer system 800.

System 800 also includes one or more signal generating and receiving device(s) 1030 coupled with bus 1004 for enabling system 800 to interface with other electronic devices and computer systems. Signal generating and receiving device(s) 1030 of the present embodiment may include wired serial adaptors, modems, and network adaptors, wireless modems, and wireless network adaptors, and other such communication technology. The signal generating and receiving device(s) 1030 may work in conjunction with one or more communication interface(s) 1032 for coupling information to and/or from system 800. Communication interface 1032 may include a serial port, parallel port, Universal Serial Bus (USB), Ethernet port, Bluetooth, thunderbolt, near field communications port, WiFi, Cellular modem, or other input/output interface. Communication interface 1032 may physically, electrically, optically, or wirelessly (e.g., via radio frequency) couple computer system 800 with another device, such as a mobile telephone, radio, or computer system.

The computing system 800 is only one example of a suitable computing environment and is not intended to suggest any limitation as to the scope of use or functionality of the present technology. Neither should the computing environment be interpreted as having any dependency or requirement relating to any one or combination of components illustrated in the example computing system 800.

The present technology may be described in the general context of computer-executable instructions, such as program modules, being executed by a computer. Generally, program modules include routines, programs, objects, components, data structures, etc., that perform particular tasks or implement particular abstract data types. The present technology may also be practiced in distributed computing environments where tasks are performed by remote processing devices that are linked through a communications network. In a distributed computing environment, program modules may be located in both local and remote computer-storage media including memory-storage devices.

The foregoing Description of Embodiments is not intended to be exhaustive or to limit the embodiments to the precise form described. Instead, example embodiments in this Description of Embodiments have been presented in order to enable persons of skill in the art to make and use embodiments of the described subject matter. Moreover, various embodiments have been described in various combinations. However, any two or more embodiments may be combined. Although some embodiments have been described in a language specific to structural features and/or methodological acts, it is to be understood that the subject matter defined in the appended claims is not necessarily limited to the specific features or acts described above. Rather, the specific features and acts described above are disclosed by way of illustration and as example forms of implementing the claims and their equivalents.

What is claimed is:

1. A computer-implemented method, the method comprising:
    interacting with, via a mobile device of a user, a capturable code, wherein said interacting is performed by a capture capability of said mobile device, said capture capability selected from a group consisting of: a camera, a microphone, and a radio communication;
    automatically generating a text message on said mobile device in response to said interacting with said capturable code,
        the automatically generating of the text message comprising:
            automatically providing an address for said text message, said address for said text message being a credit account provider's computer system;
            automatically incorporating a device identifier (device ID) with said text message; and
            automatically formatting said text message, said text message formatting comprising a request for a user identifier (user ID);
    automatically presenting said text message on a display of said mobile device;
    sending, via the mobile device, the text message to said credit account provider's computer system;
    receiving, at said credit account provider's computer system, said text message;
    utilizing, at said credit account provider's computer system, said text message to perform a search for a user specific information for said user;
    obtaining, at said credit account provider's computer system, a result of said search, said result comprising said user specific information;
    prefilling, at said credit account provider's computer system, a form with said user specific information to obtain a prepopulated form;
    accessing, at the mobile device, said prepopulated form;
    verifying, at the mobile device, the user specific information of said prepopulated form;
    providing, to said credit account provider's computer system, said verification;
    performing, at said credit account provider's computer system, a credit approval process;
    generating, at said credit account provider's computer system and upon a successful credit approval, a new credit account; and
    receiving, at the mobile device and from said credit account provider's computer system, a new credit account in a ready-to-use format.

2. The computer-implemented method of claim 1, further comprising:
    said automatically formatting said text message comprising a request for a user identifier (user ID); and
    performing said search for said user specific information for said user comprises:
        utilizing the device ID to perform a proprietary database search for the user specific information;
        utilizing the user ID to perform a proprietary database search for the user specific information; or
        utilizing the device ID and the user ID to perform a proprietary database search for the user specific information.

3. The computer-implemented method of claim 2, wherein if no user specific information is found during said proprietary database search, said obtaining the user specific information further comprises:
    performing a secondary source database search for the user specific information.

4. The computer-implemented method of claim 1, further comprising:
    utilizing a confidence factor threshold to validate said user specific information, such that only user specific information above said confidence factor threshold is utilized to populate the prepopulated form.

5. The computer-implemented method of claim 1, further comprising:
    obtaining authorization for the generated text message to access location information for the mobile device.

6. The computer-implemented method of claim 5, further comprising:
    receiving location information for the mobile device; and
    utilizing the location information to verify any location information provided to the prepopulated form.

7. The computer-implemented method of claim 6, further comprising:
    performing a fraud risk assessment based on a result of the verifying.

8. A non-transitory computer-readable medium for storing instructions, the instructions comprising:
    one or more instructions which, when executed by one or more processors of a mobile device, cause one or more processors to:
        interact with a capturable code, wherein said interacting is performed by a capture capability of said mobile device, said capture capability selected from a group consisting of: a camera, a microphone, and a radio communication;
        automatically generate a text message in response to said interaction with said capturable code,
            the automatic generation further causes the one or more processors to:

automatically provide an address for said text message, said address for said text message being a credit account provider's computer system;
automatically incorporate a device identifier (device ID) with said text message; and
automatically format said text message;
transmit said text message to said credit account provider's computer system;
receive, from said credit account provider's computer system, access to a prepopulated form, the prepopulated form prefilled, by said credit account provider's computer system, with an amount of user specific information;
verify the user specific information of said prepopulated form;
transmit, to said credit account provider's computer system, said verification; and
receive, from said credit account provider's computer system and upon a credit approval, a new credit account in a ready-to-use format.

9. The non-transitory computer-readable medium of claim 8, where the one or more instructions further cause one or more processors to:
said automatically format of said text message to comprise a request for a user identifier (user ID), wherein said credit account provider's computer system is configured to:
utilize the device ID to perform a proprietary database search for the user specific information;
utilize the user ID to perform a proprietary database search for the user specific information; or
utilize the device ID and the user ID to perform a proprietary database search for the user specific information.

10. The non-transitory computer-readable medium of claim 9, wherein said credit account provider's computer system is further configured to:
perform a secondary source database search for the user specific information.

11. The non-transitory computer-readable medium of claim 8, wherein said credit account provider's computer system is further configured to:
utilize a confidence factor threshold to validate said user specific information, such that only user specific information above said confidence factor threshold is utilized to populate the prepopulated form.

12. The non-transitory computer-readable medium of claim 8, where the one or more instructions further cause one or more processors to:
obtain authorization for the generated text message to access location information for the mobile device.

13. The non-transitory computer-readable medium of claim 12, where the one or more instructions further cause one or more processors to:
receive location information for the mobile device; and
utilize the location information to verify any location information provided to the prepopulated form.

14. The non-transitory computer-readable medium of claim 13, wherein said credit account provider's computer system is further configured to:
perform a fraud risk assessment based on a result of the verification.

15. A system comprising:
a mobile device of a user, said mobile device comprising:
a display;
a memory;
a capture capability, said capture capability selected from a group consisting of: a camera, a microphone, and a radio communication; and
one or more processors, said mobile device configured to:
interact with a capturable code, wherein said interacting is performed by said capture capability;
automatically generate a text message in response to said interaction with said capturable code, said automatic generation of said text message comprising:
automatically provide an address for said text message, said address for said text message being a credit account provider's computer system;
automatically incorporate a device identifier (device ID) with said text message; and
automatically format said text message;
transmit said text message to a credit account provider's computer system;
said credit account provider's computer system comprising one or more processors, said credit account provider's computer system configured to:
receive said text message;
utilize said text message to perform a search for a user specific information for said user;
obtain a result of said search, said result comprising said user specific information;
prefill a form with said user specific information to obtain a prepopulated form;
said mobile device further configured to:
access said prepopulated form;
verify said user specific information; and
transmit said verification to said credit account provider's system;
said credit account provider's computer system further configured to:
perform a credit approval process; and
generate, upon a successful credit approval, a new credit account; and
said mobile device further configured to:
receive, from said credit account provider's computer system, a new credit account in a ready-to-use format.

16. The system of claim 15, wherein said credit account provider's computer system configured to obtain said user specific information is further configured to:
utilize said device ID to perform a proprietary database search for the user specific information;
utilize said user ID to perform a proprietary database search for the user specific information; or
utilize said device ID and the user ID to perform a proprietary database search for the user specific information.

17. The system of claim 16, wherein if no user specific information is found during said proprietary database search, wherein said credit account provider's computer system configured to obtain said user specific information is further configured to:
perform a secondary source database search for the user specific information.

18. The system of claim 15, wherein said credit account provider's computer system is further configured to:
utilize a confidence factor threshold to validate said user specific information, such that only user specific information above said confidence factor threshold is utilized to populate the prepopulated form.

19. The system of claim 15, wherein said mobile device is further configured to:

obtain authorization for the generated text message to access location information for the mobile device.

20. The system of claim 19, wherein said credit account provider's computer system is further configured to:
receive said location information for the mobile device;
utilize said location information to verify any location information provided to the prepopulated form; and
perform a fraud risk assessment based on a result of the verifying.

* * * * *